US011920314B2

(12) United States Patent
Straalsund et al.

(10) Patent No.: US 11,920,314 B2
(45) Date of Patent: Mar. 5, 2024

(54) BI-DIRECTIONAL FISH PASS HELIX

(71) Applicant: Percheron Power, LLC, Kennewick, WA (US)

(72) Inventors: Jerry L. Straalsund, Kennewick, WA (US); Sharon D. Atkin, Kennewick, WA (US)

(73) Assignee: Percheron Power, LLC, Kennewick, WA (US)

( * ) Notice: Subject to any disclaimer, the term of this patent is extended or adjusted under 35 U.S.C. 154(b) by 179 days.

(21) Appl. No.: 17/495,656

(22) Filed: Oct. 6, 2021

(65) Prior Publication Data

US 2022/0106754 A1    Apr. 7, 2022

Related U.S. Application Data

(60) Provisional application No. 63/088,274, filed on Oct. 6, 2020.

(51) Int. Cl.
*E02B 8/08* (2006.01)

(52) U.S. Cl.
CPC ................... *E02B 8/085* (2013.01)

(58) Field of Classification Search
CPC ................. E02B 8/08; E02B 8/085
USPC ..................... 405/81, 82; 119/219
See application file for complete search history.

(56) References Cited

U.S. PATENT DOCUMENTS

| 3,962,876 A | 6/1976 | Phillips |
| 2016/0201283 A1 | 7/2016 | Fjalling |
| 2020/0040907 A1 | 2/2020 | Straalsund et al. |

FOREIGN PATENT DOCUMENTS

| AT | 509209 | * | 7/2011 |
| AT | 517679 | * | 3/2017 |
| DE | 202011108819 U1 | | 1/2012 |
| DE | 102016005862 | * | 9/2017 |
| EP | 1930597 A2 | | 6/2008 |

OTHER PUBLICATIONS

International Search Reprot and Written Opinion for PCT Application No. PCT/US21/53828, dated Jan. 21, 2022.

* cited by examiner

*Primary Examiner* — Sunil Singh
(74) *Attorney, Agent, or Firm* — Lee & Hayes P.C.

(57) ABSTRACT

A fish pass system includes a helical blade having an outside diameter and an inside diameter extending between a first side of the helical blade and a second side of the helical blade. The inside diameter controls a flow of water flowing in a direction from the first side to the second side, and the inside diameter defines an open center of the fish pass system. Fish traveling in an opposite direction to the direction of the flow of the water pass through the fish pass system by riding in a space between helical blades as the helical blades are rotating, and fish traveling in the direction of the flow of the water pass through the open center of the fish pass system by swimming or moving over the inside diameter of the helical blades.

20 Claims, 38 Drawing Sheets

BI-DIRECTIONAL FISH PASS HELIX

RELATED APPLICATIONS

This application claims priority to U.S. Provisional Application No. 63/088,274, filed on Oct. 6, 2020, the entire contents of which are incorporated herein by reference.

BACKGROUND

Technical Field

This disclosure relates to a fish pass system for low-head hydropower applications. The fish pass system may be utilized independently of a hydropower system, to connect or reconnect fish habitat across existing or future planned low head barriers in a riverine resource. The fish pass system may be capable of providing appropriate conditions for safe passage of fish both upstream and downstream.

Description of the Related Art

Traditional Archimedes Screws have been successfully used as a "fish pump" to move fish for decades. For most of these existing devices, the fish are "crowded" or forced into the end and then are safely conveyed upstream or downstream depending on the direction of rotation of the screw. The significant benefit to fish is that they do not experience any head or pressure drop within the Archimedes screw, as they maintain the same distance from the water surface elevation during travel through the screw. Similarly, Archimedes Hydrodynamic Screw Turbines have been shown to be very safe at conveying fish downstream through the turbine when it is operating. However, even though fish may be conveyed upstream or downstream depending on the direction of rotation of the screw, these existing devices do not allow for conveying fish upstream and downstream in the same device. By design, any Archimedes screw with a center tube or pipe can only transport fish in one direction (either uphill or downhill, depending on the direction of the rotation) because the fish are "trapped" in the buckets between the blades and the center tube. In nature, upstream and downstream migrations occur in the same region all the time, but as discussed above, the existing devices only provide one-way passage.

Accordingly, there remains a desire to provide for a fish pass system capable of conveying fish upstream and downstream within the same device, over the same time period.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

Figure 1:
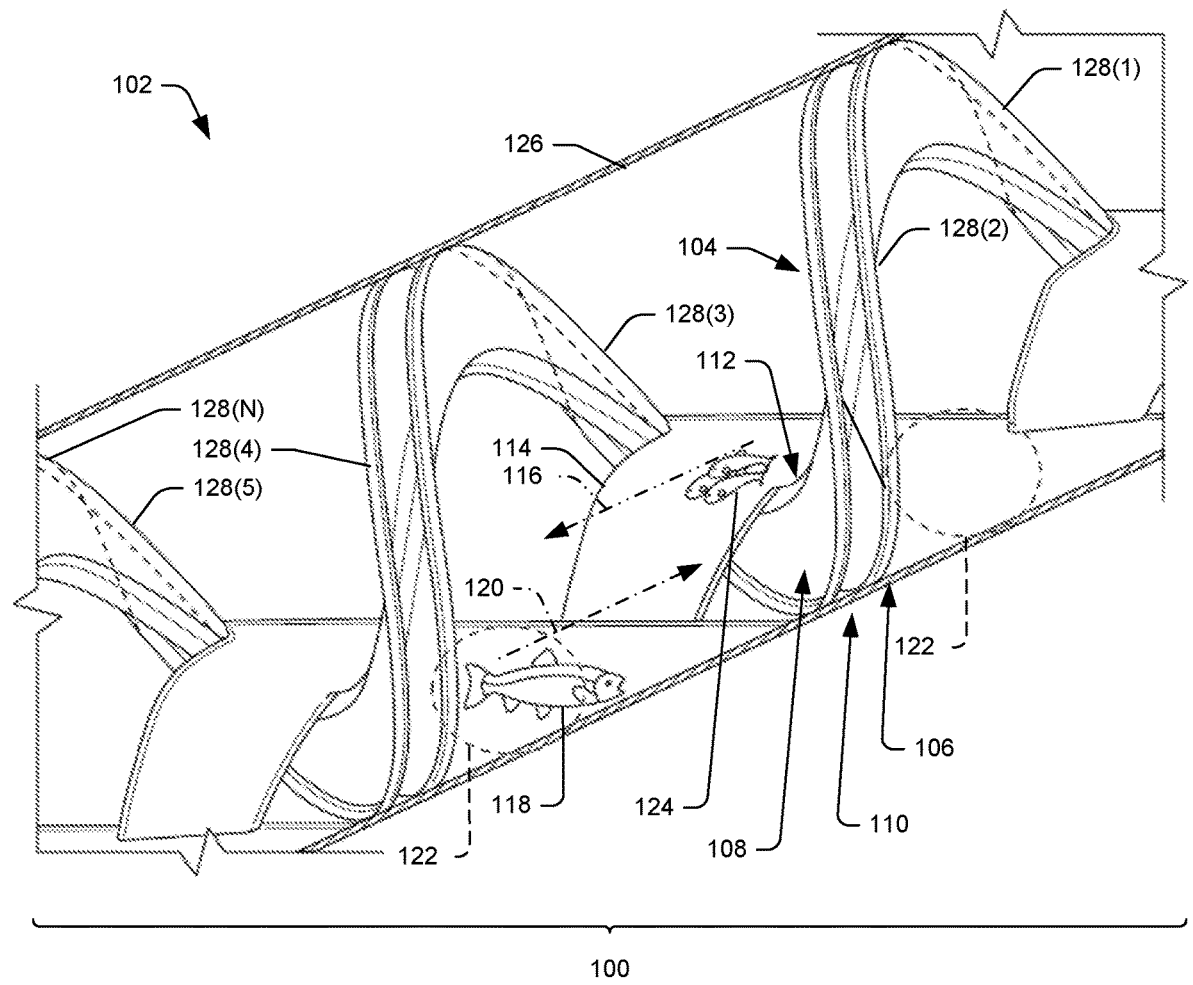
FIG. 1 illustrates a perspective view of a fish pass system according to an embodiment of this disclosure.

The following disclosure describes various features and concepts for implementation in a fish pass system. That is, while the disclosure describes "a" or "the" fish pass system, the article (e.g., "a," "an," or "the") used preceding "fish pass system" is not intended to indicate a limitation of the features of the system itself, unless otherwise so stated. Indeed, multiple embodiments of a fish pass system may be possible by using one or more of the various features and concepts in varying implementations and/or combinations. For example, while the figures may depict an embodiment of a fish pass system for transporting fish, it is contemplated that one or more features and concepts described herein as related to the fish pass system may be implemented to transport any object or living thing. For example, an embodiment of the features of the fish pass system may not require water for transporting solid objects (e.g., boulders, rocks, gravels, sand, debris, etc.), or water could be used to reduce the weight of the solid objects during transport. It is also contemplated that one or more features and concepts described herein as related to the fish pass system may be implemented for other types of work. For example, an embodiment of the features of the fish pass system may be configured to provide a separation system (e.g., a sluice box.), as a wetting system (e.g., to keep solids wet during transport).

A fish pass system as disclosed herein may have a primary function of enabling fish passage for low-head hydropower applications (typically elevation changes between headwater and tailwater of <30 ft). The fish pass systems as disclosed herein may be modular to enable the fish pass systems to be utilized independently of a hydropower system, to connect or reconnect fish habitat across existing or future planned low head barriers in a riverine resource. The fish pass systems may be turned or rotated "uphill" which allows fish to be transported upstream by riding in the water contained between the helical turns. At the same time the helix is turning "uphill," the entry to the helix at the upstream end is partially submerged so that water is also entering the helix and cascading down through the hollow center. This may provide passage for fish traveling downstream and within the hollow center at the same time, or over the same period, as other fish are being transported upstream. It is well understood that fish migrate upstream by sensing "attraction flows." The open central passage or hollow center fulfills at least two key requirements: (1) it provides attraction flow so upstream traveling fish can find the entryway at the bottom; and (2) downstream traveling fish can pass with the flow moving through the open central passage. Further, the center shaft is completely eliminated to provide smooth passage for downstream traveling fish and unobstructed entry and exit for upstream traveling fish. The open central passage or hollow center of the fish pass systems as disclosed herein may provide for a two-way passage that is considered safe and effective for fish by wildlife agencies.

In an embodiment, a fish pass system may accommodate a 5-ft change in headwater and a 3-ft change in tailwater by allowing the upper end of the helix to travel up and down, like a slide gate ("Inlet Lift and Support"), while the bottom portion also may travel up and down on a rail support structure ("Outlet Lift and Support") that rotates back and forth to accommodate the change in horizontal length of the helix as the angle of inclination is changed. Alternate mechanical/structural designs could be employed to perform the functions of the Outlet Lift and Support. Depending on the specific site, the elevations changes for the upper and lower end of the tube could either be manually operated (in circumstances where elevations remain relatively constant, or change on known intervals); or be automated by a means of a float, optical or other sensor device to track automatically with the changing headwater and tailwater surface elevations. This is important because both ends of the tube of the fish pass system need to be contacting the water to accomplish upstream and downstream migration in the same device. If the top end comes out of the water, then fish traveling downstream can't easily enter the tube, and attraction flow through the tube would be interrupted (making it difficult for upstream migrating fish to find the entrance at the bottom). Similarly, if the bottom end comes out of the water, upstream migrating fish will be "cut off" unless they can jump into the lower end of the rotating tube. While this embodiment may be affixed to a slide gate ("Inlet Lift and Support") and/or a rail support structure ("Outlet Lift and Support"), it is contemplated that the fish pass systems may be structured in other configurations (different than shown) with different connection means (not shown), which may be more compatible with other types of site works (not shown), with transporting other objects (not shown) other than fish. In such alternative embodiments, it is contemplated that features and processes executed by the fish pass system may be the same or similar to those described herein. Moreover, it is also understood that in such alternative structural configurations, that the processes described herein may be modified compared to those described herein below to compensate for the change in structure and/or difference in relative mounting, etc. Thus, a fish pass system may be formed in other structural embodiments including, but not limited to, a structure configured for low-head hydropower applications. It further follows that the arrangement and orientation of components in a fish pass system embodiment may be altered from the description herein to adjust for differences that may exist in different fish species and life stages of fish in the manner of transportation according to a fish, a life stage of a fish or a different fish species. The fish pass system may track with the headwater elevation (and possibly the tailwater elevation, depending on the specific site), as both ends need to be "underwater" for fish to find/enter the helix for two-way passage. In contrast, some existing upstream passage designs for Archimedes-type fishways have the upstream end out of the water and don't control this height with changing headwater or tailwater levels (the fish just come "flying" out of the upper end of the Archimedes screw and drop back into the headwater or to a "discharge tube").

The fish pass system may be manually operated and/or automatically operated to adjust the locations of the top end and/or the bottom end out to purposely place either or both ends out of the water to prevent fish migration (either upstream, downstream, or both) at particular locations or times, or for sampling/trapping fish, or to target particular species. The fish pass system may readily transport fish downstream even if the helix is not turning (rotating) and may allow or prevent upstream migration for some species even if it is not turning (rotating).

Regardless of structural configuration, in an embodiment, a fish pass system may include a helical blade. The helical blade may include a first side opposite a second side, an outside diameter extending between the first side and the second side, and an inside diameter extending between the first side and the second side. The inside diameter of the helical blade controls a flow of water flowing in a direction from the first side to the second side, and the inside diameter defines an open center of the fish pass system. Fish traveling in an opposite direction to the direction of the flow of the water pass through by riding in the space between the helical blades as the helical blades are rotating, and the fish traveling in the direction of the flow of the water pass through the open center of the fish pass by swimming or moving over the inside diameter of the helical blades. Upstream and downstream traveling fish may or may not travel in opposite directions through the fish pass, or be present at the same time in the device, according to the natural migration patterns for their species in the waterway.

The fish pass system may include one or more helical flights of a blade that is formed of a plurality of blade segments. Each of the plurality of blade segments may be removably attachable to each other along a helical length of the helical blade. Thus, because the blade segments may be removably attachable to each other along a helical length of the helical blade, the fish pass systems may be shipped unassembled and subsequently assembled in the field reducing an amount of time and a cost of deploying traditional Archimedes Screw fish pump systems. The removable blades may also be maintained or replaced as needed in the field without removing the fish pass system.

In an embodiment, the fish pass system may include a helical blade formed of a composite material. For example, the fish pass system may include a helical blade formed of fiber and resin composites (e.g., fiberglass), carbon-reinforced composites, plastics, metal or any other material or combination of materials.

Additionally, in an embodiment, the fish pass system may include a helical blade that is formed of a plurality of cross sections. Each of the plurality of cross sections including a portion of the helical blade fabricated as an integral part of an outer tube. Each of the plurality of cross sections may be removably attachable to each other along the length of the fish pass system. Thus, because the cross sections may be removably attachable to each other, the fish pass systems may be shipped unassembled and subsequently assembled in the field reducing an amount of time and a cost of deploying traditional Archimedes Screw fish pump systems. The cross sections also may be maintained or replaced as needed in the field without removing the fish pass system.

Additionally, in an embodiment, the fish pass system may be formed via a closed mold system formation process. For example, the fish pass system may be formed via a vacuum bag or light resin transfer molding process. While this application describes fish pass systems that may be formed via a closed mold system process, the blade segments may be formed via other processes. For example, the blade segments may be formed via a 3D (three-dimensional) printing process, an open mold process, a rotational mold process, an additive manufacturing process, an injection molding process, a rapid prototype process, a CNC (computer numerical control) machining process, a casting process, etc.

Additionally, in an embodiment, the fish pass system may be formed via a hybrid method. The hybrid method may include fabricating the helix as a full or part cross sections or flights. The hybrid method may also include fabricating a relatively stronger cylinder or pipe on the outside (using, for example, filament-wound pipe as the outer casing to improve the strength of the outer tube (particularly for bending).

The specific materials chosen for the helix and tube may be inter-related to the fabrication method selected. The materials could be fiber and resin composites (such as fiberglass), carbon-reinforced composites, nylon, plastics, metal, or other materials.

The full-cross sections may be connected to each other in various ways (by an integral flange, or separate flange, or overlapping tubes that fit within each other, etc.). The flange or connections may be made of multiple materials, including composites, plastics, and metal or steel.

The helix segments themselves may be solid or hollow, or filled with a separate material before or after making the helix. The segments may be mechanically attached or bonded to the inner wall of the tube, or the attachment could go through the tube wall from the outside or inside.

The tube may be made as an integral part with the segments or made separately in whole or half-round or other longitudinal sections. Hybrid fabrication methods may also be used, such as additive manufacturing of the inside segments and inner wall of the tube, followed by filament-winding or a forming process to complete the tube and increase the strength of the final component.

The fish pass system may be modular which allows the same diameter Helix Component to be used over a variety of head ranges simply by stacking together more "modules" of the Helix Component.

Illustrative Embodiments of a Fish Pass System

FIG. 1 illustrates perspective view 100 of a portion of a fish pass system 102 according to an embodiment of this disclosure. The fish pass system 102 may include a helical blade 104. The helical blade 104 may include a first side 106 opposite a second side 108, an outside diameter 110 extending between the first side 106 and the second side 108, and an inside diameter 112 extending between the first side 106 and the second side 108. The inside diameter 112 of the helical blade 104 may provide for controlling a flow of water 114 flowing in a direction 116 from the first side 106 to the second side 108. The inside diameter 112 defines an open center of the fish pass system, such that fish 118 traveling in an opposite direction 120 to the direction 116 of the flow of the water 114 pass through the fish pass by riding in a space 122 between the helical blades (e.g., "buckets") as the helical blade is rotating, and fish 124 traveling in the direction 116 of the flow of the water 114 pass through the open center of the fish pass by swimming or moving over the inside diameter 112 of the helical blade. While FIG. 1 illustrates fish traveling in opposite directions or simultaneously, fish may or may not travel in opposite directions or simultaneously, according to the natural migration patterns for their species.

A volume of water within the space 122 between the helical blade 104 (e.g., individual buckets of the helical blade 104) may vary for different orientations/designs (number of fights, pitch, shape, etc.). These volumes of the spaces 122 and corresponding flow rates may be calculated as dimensionless parameters (such as the ratio of the inner diameter of the helix to the outer diameter) so that calculations can be scaled from micro or bench-scale models of the fish pass system (~3-inch diameter) up to 6-ft diameter or more of the fish pass system. Similarly, hydraulic behavior modeled for a smaller scale version of the fish pass system can be scaled for larger systems using hydraulic scaling rules. Different diameter helices may be needed to optimally transport different sizes/species/life stage of fish.

The helical blade 104 may be arranged inside of a tube 126. In one example, power that may be required to rotate the tube 126 containing the helical blade 104 and the water 114 at about 10 rpm, which may take less than two horsepower to rotate a 30-ft long tube with an outer diameter of 3-ft and containing 4 helical flights with a pitch to diameter ratio of 1, and which is half-filled with water at a 25-degree inclination angle.

The helical blade 104 may be formed of a plurality of blade segments 128(1)-128(n). Each of the plurality of blade segments 128(1)-128(n) may be removably attachable to each other along a helical length of the helical blade 104.

Figure 2:
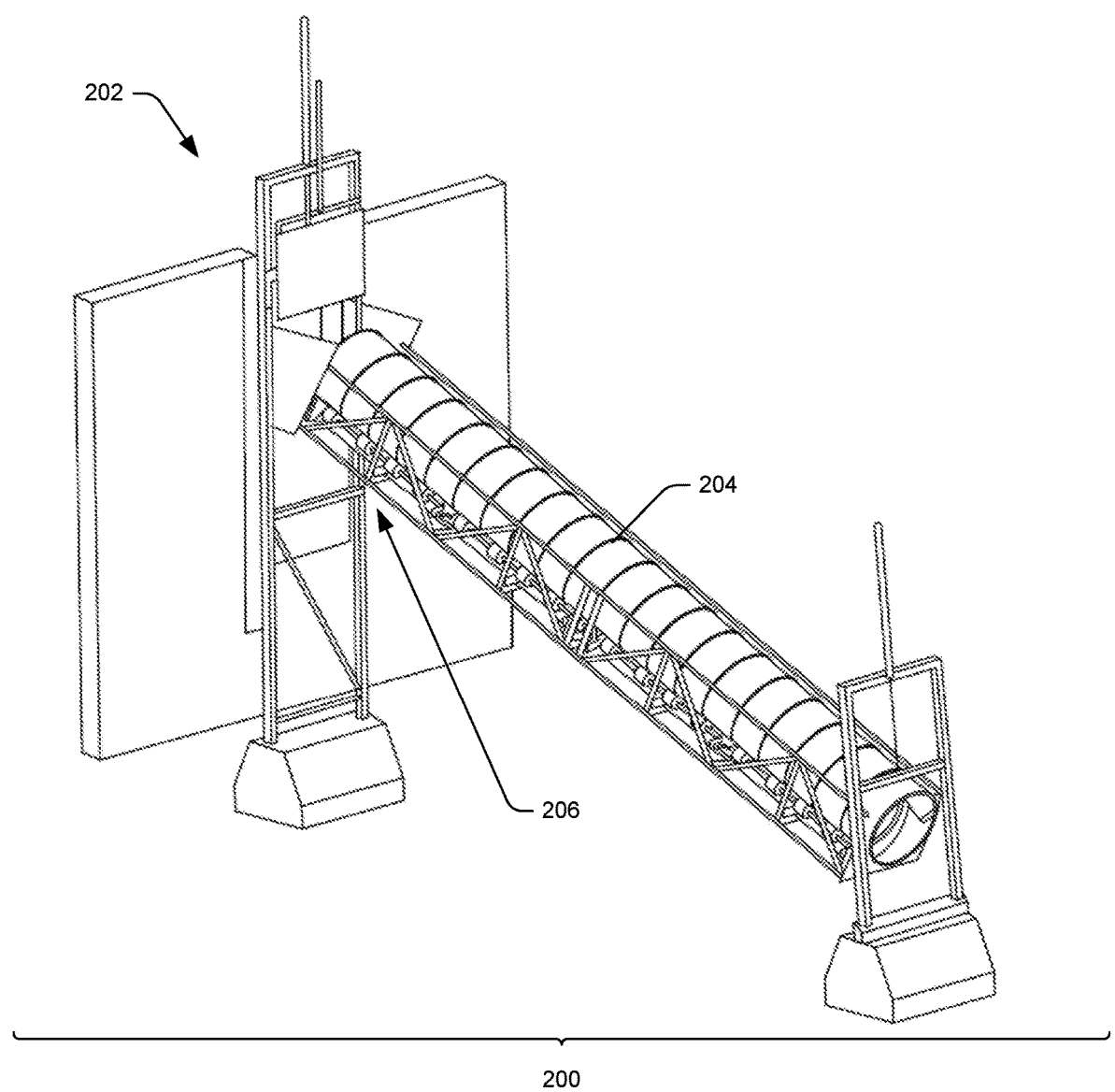
FIG. 2 illustrates a perspective view of a fish pass system according to an embodiment of this disclosure.

FIG. 2 illustrates a perspective view 200 of a fish pass system 202 according to an embodiment of this disclosure. The fish pass system 202 may be the same as the fish pass system 102. The fish pass system 202 may include about a 3-ft diameter outer tube 204 with a length of about 30-ft. The tube 204 may be the same as the tube 126. In one example, loads on a foundation or substructure for a 3-ft diameter outer tube with a length of 30-ft, which may contain four helical flights with a pitch to diameter ratio of about 1, may be about 5,876 pounds (including water) with the helix at an inclination angle of about 30 degrees, and a lateral force may be applied on a headwall of about 1,162 pounds.

The fish pass system 202 may include a facility 206 that may support and/or rotate the helical blade and/or tube. The facility 206 may provide for and adapt to changing headwater and tailwater elevations (at the entrance and exit of the fish pass system). Notably, the facility 206 may include a skeletal framed substructure for supporting the other components.

Figure 3:
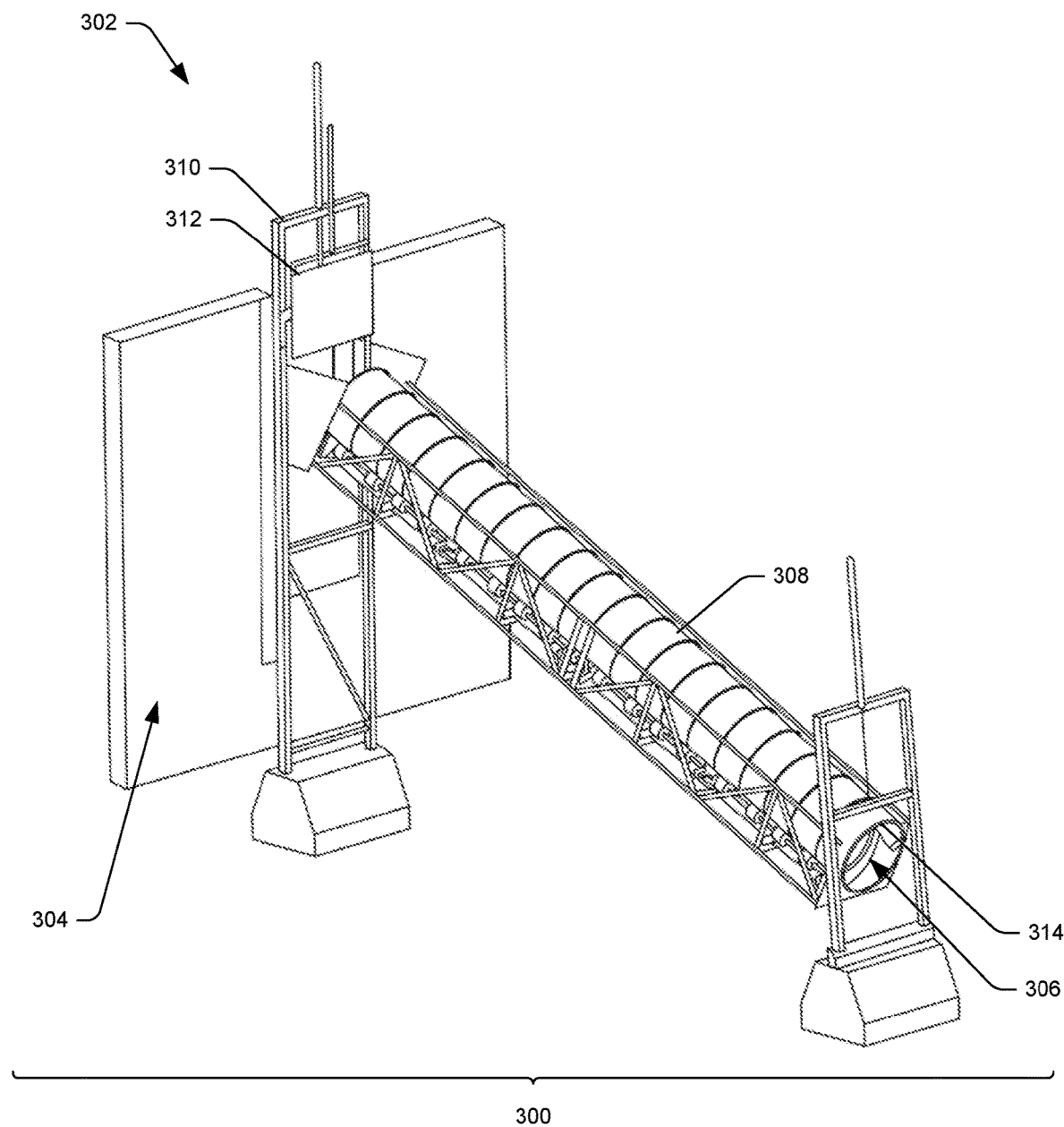
FIG. 3 illustrates a perspective view of a fish pass system according to an embodiment of this disclosure.
Figure 4A:
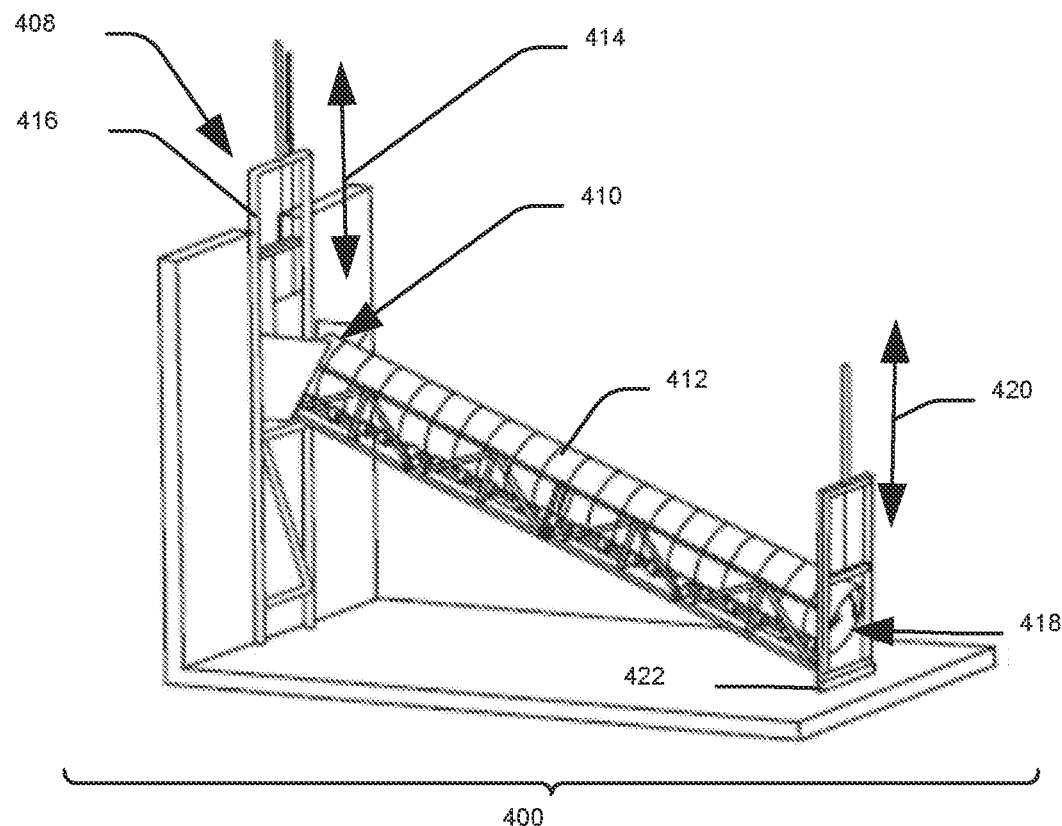
FIGS. 4A, 4B, 4C, and 4D illustrate perspective views of a fish pass system according to an embodiment of this disclosure.
Figure 4B:
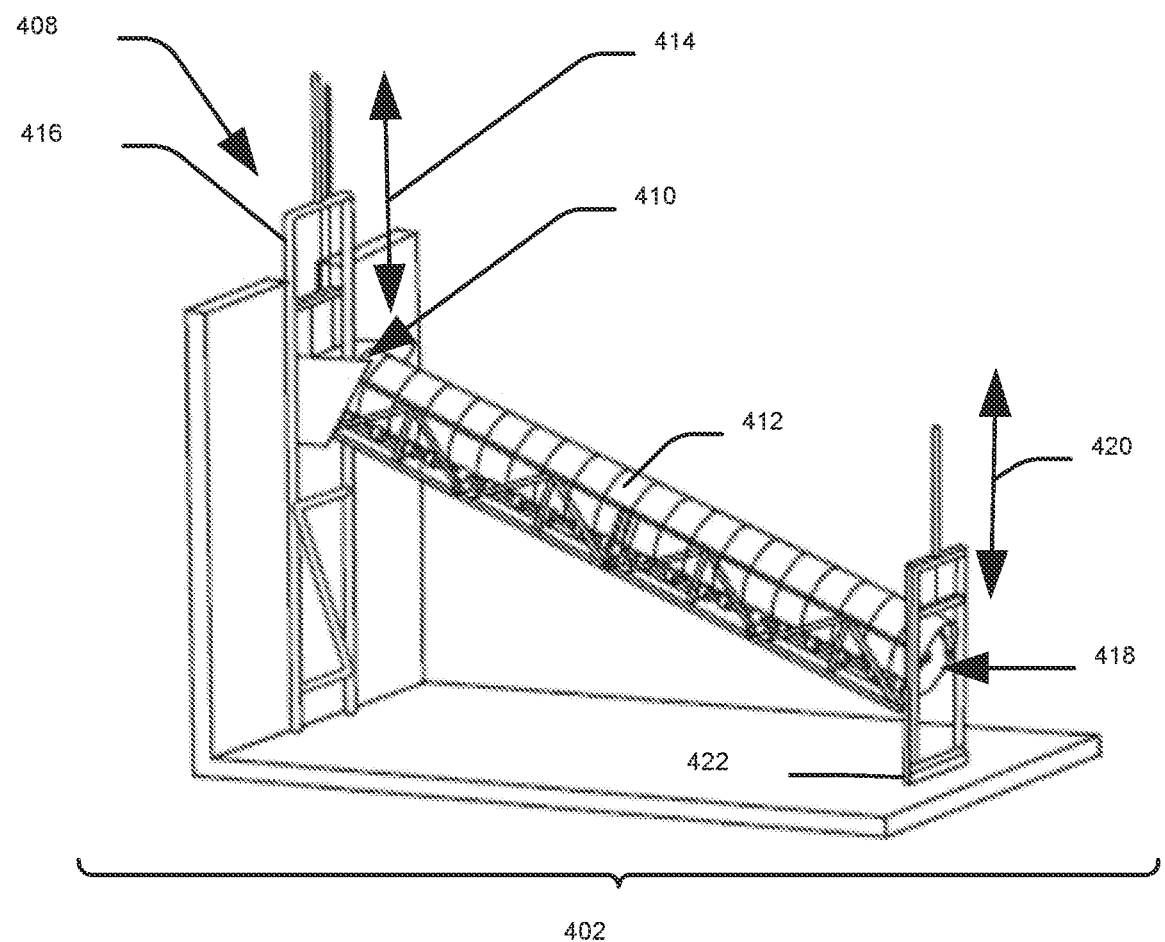
Figure 4C:
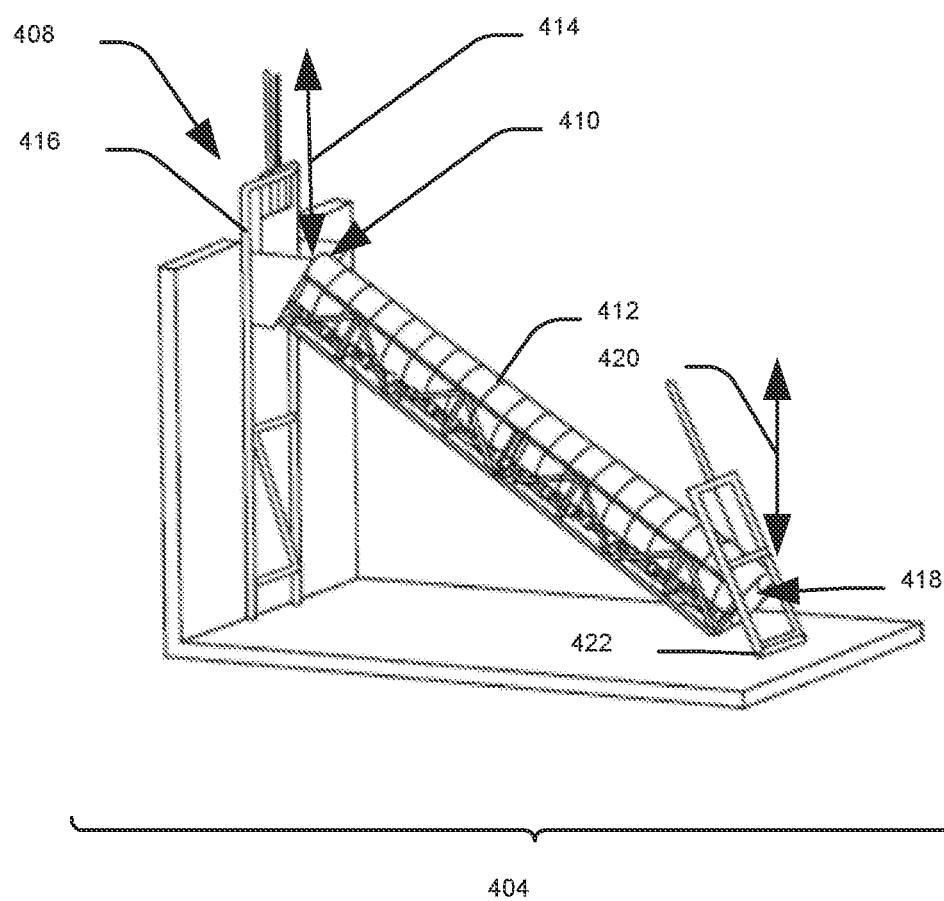
Figure 4D:
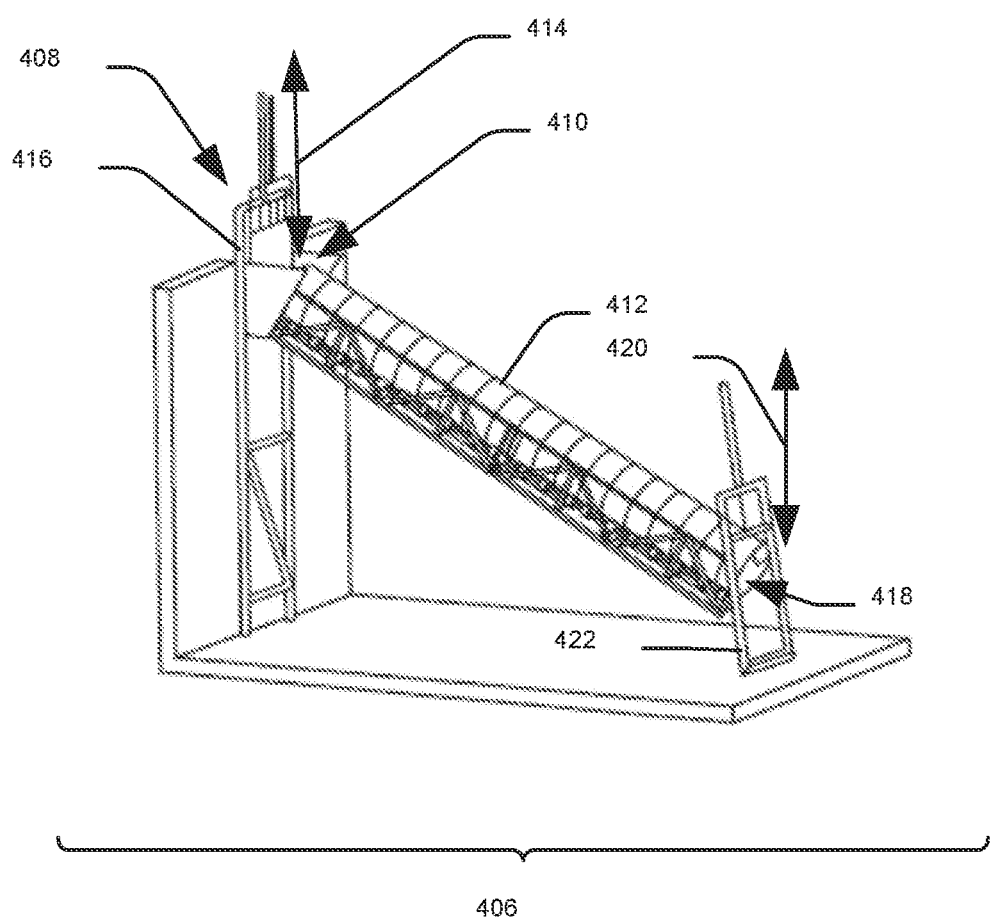

FIG. 3 illustrates a perspective view 300 of a fish pass system 302 according to an embodiment of this disclosure. The fish pass system 302 may be the same as any one of the fish pass systems 102 or 202. FIG. 3 illustrates that a foundation module 304 may be a headwall of a dam or weir which is holding an upstream water back. A helix 306 is contained within a tube 308 (e.g., "Fish Pass Helix Component") and this tube 308 interfaces with the headwall of the dam or weir via a connection device 310 (e.g., slot, rail, inlet lift support structure, slide rails, etc.). This allows the upstream water to enter the tube 308, which the water may be controlled via a gate 312 (e.g., sliding gate, sluice, etc.). The water travels down the center of the tube 308, over the blades of the helix 306, and exits at the downstream end 314 of the tube 308 (presumably flowing back into the waterway).

FIG. 4 illustrates perspective views 400, 402, 404, and 406 of a fish pass system 408 according to an embodiment of this disclosure. The fish pass system 408 may be the same as any one of the fish pass systems 102, 202, or 302. The fish pass system 408 may accommodate about a 5-ft change in headwater and about a 3-ft change in tailwater by allowing an upper end 410 of a tube 412 to travel up and down 414 on a connection device 416 (e.g., slot, rail, inlet lift support structure, slide rails, etc.), while a lower end 418 of the tube 412 also may travel up and down 420 on a rail support structure 422 ("Outlet Lift and Support") that rotates back and forth to accommodate the change in horizontal length of the tube 412 as the angle of inclination is changed. The tube 412 may be the same as the tube 126, 204, or 308. Depending on the specific riverine site, the elevation changes for the upper and lower ends 410 and 416 of the tube 412 could either be manually operated (in circumstances where elevations remain relatively constant, or change on known intervals); or be automated by a means of a float, optical or other sensor device to track automatically with the changing headwater and tailwater surface elevations. This is important because both the upper end 410 and the lower end 418 of the tube 412 may need to be contacting the water to accomplish upstream and downstream migration at the same time. If the upper end 410 comes out of the water, then downstream fish may not easily enter the tube 412, and attraction flow through the tube 412 may be interrupted (making it difficult for upstream migrating fish to find the entrance at the lower end 418 of the tube 412). Similarly, if the lower end 418 of the tube 412 comes out of the water, upstream migrating fish may be "cut off" unless they can jump into the lower end 418 of the tube 412.

Perspective views 400, 402, 404, and 406 show four (4) positions (Perspective View 400; Position 1: Perspective View 402; Position 2: Perspective View 404; Position 3: and Perspective View 406; Position 4:) of the fish pass system 408 which may provide for accommodating up to about a 5-ft change in headwater elevation (which is the upstream side of the fish pass system 408 shown on the left side of 400 through 406), and/or about a 3-ft change in tailwater elevation (which is the downstream side of the fish pass system 408 shown on the right side of 400 through 406). In perspective view 400, both the upstream and downstream ends of the fish pass system 408 are at the lowest elevation (~5 ft headwater and −3 ft tailwater). In perspective view 402, the headwater elevation remains the same, but the tailwater is at the nominal (or zero) setting. In perspective view 404, the headwater level is at the nominal (or zero) setting and the tailwater is at −3 ft. In perspective view 406, both the headwater and tailwater are at the nominal (or zero) setting. The ability to accommodate or adjust to varying head and tailwater levels is of significant value for the fish pass system 408 because surface elevations in the natural waterways may vary throughout the year, unless they are controlled by a dam or other feature (and many of these "control" the water height but at various selected elevations throughout the season).

While FIG. 4 illustrates a fish pass system 408 that may accommodate about a 5-ft change in headwater elevation and/or about a 3-ft change in tailwater elevation, the fish pass systems according to this disclosure may accommodate a wide range of water levels either manually or automatically.

Figure 5A:
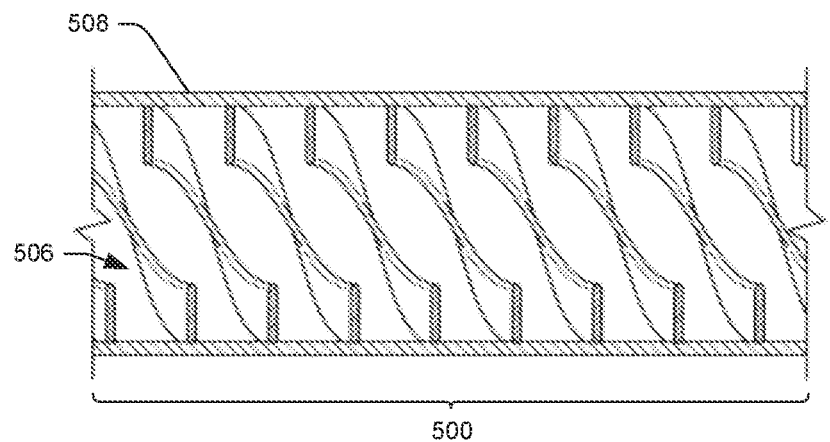
FIGS. 5A, 5B, and 5C illustrate cross-sectional views of helical blades according to embodiments of this disclosure.
Figure 5B:
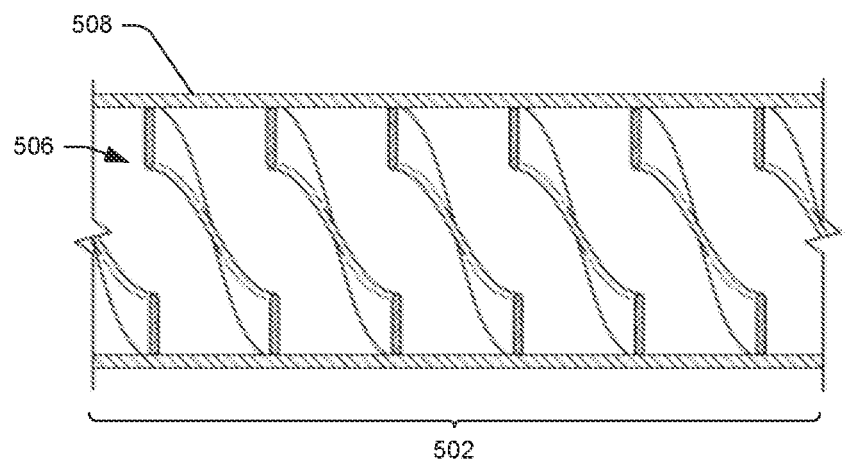
Figure 5C:
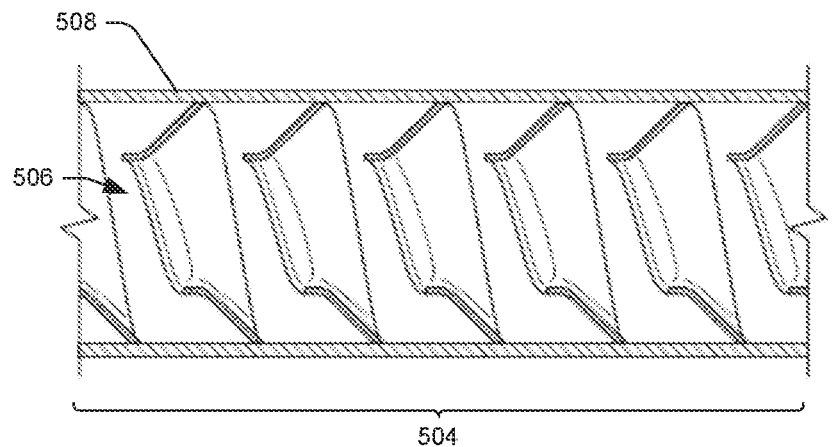

FIG. 5 illustrates a first cross-section view 500, a second cross-section view 502, and a third cross-section view 504 of fish pass systems according to embodiments of this disclosure. The first, second, and third cross-section views 500-504 illustrate a helical blade 506 located within a tube 508. The helical blade 506 may be the same as the helical blades 104 or 306. The first, second, and third cross-section views 500-504 illustrate the helical blade 506 is a spiral blade or set of blades. The number of flights of the helical blade 506, the pitch (or the pitch to diameter ratio), the specific shape or cross-section of the blades, as well as the height of the helical blade 506 (the inner diameter of the helical blade 506 or distance from the center-line of the tube 508) and rotational speed may be varied. Different fish species and life stages of fish may favor different design parameters for the helical blade 506. FIG. 5 illustrates the 3 designs shown in the first, second, and third cross-sectional views 500, 502, and 504 may have the same ratio of the outer diameter of the helical blade 506 to the inner diameter of the helical blade 506 (Ro/Ri=2). FIG. 5 illustrates the two (2) designs of the helical blade 506 shown in the first and second cross-sectional views 500 and 502 may have the same pitch to diameter ratio, or pitch to the outer radius ratio (P/Ro=2). The first cross-sectional view 500 illustrates 3 helical flights within the tube 508, the second cross-sectional view 502 illustrates 2 helical flights within the tube 508, and the third cross-sectional view 504 illustrates a single flight pocket or cupped-shape helical blade within the tube 508. While the first cross-sectional view 500 illustrates 3 helical flights, additional helical flights, or a single helical flight, are contemplated.

It is contemplated that an optimum pitch to diameter ratio, and a related pitch to diameter ratio divided by the number of flights, is expected to be between about 0.5 and about 1.5. The pitch to diameter ratio (or pitch to diameter ratio divided by the number of flights) impacts the volume of water contained within each space 122 between blades (e.g., the volume of water contained in each "bucket" between the blades) (and therefore the volume available for fish to "swim in") and affects other parameters such as water turbulence and flow velocity within the helical blade 506.

Moreover, the specific shape of the blades or segments of the helical blade 506 (the cross-section profile) may provide a more desirable shape of the rotating spaces 122 (e.g., rotating "buckets") which may transport the fish. For example, a pocket or cup-shaped helix may significantly change the shape of the "bucket" of water where fish would be located. If the "cup" of the blade is turned upward (at the inner diameter of the helix), then it is expected that fish traveling uphill between the "buckets" would be less likely to "escape" the bucket and be carried back downstream through the device's center flow stream. If the same cup-shaped blade is reversed (by turning the helix the other way around), then it is expected that fish passage would be enhanced for downstream fish traveling through the center flow stream. The shapes may be specially optimized for fish safety using rounded edges and smooth tapers. For example, the inlet and outlet blades may be tapered to minimize the potential for fish strikes on entry and exit to the fish pass system.

Moreover, it is possible to adjust and select the height for the water in the tube (for safe fish passage), and the blade height of the helix (the difference between the outer and inner radius of the helix, or the distance from the inner radius of the blades to the center-line of the tube).

Figure 6:
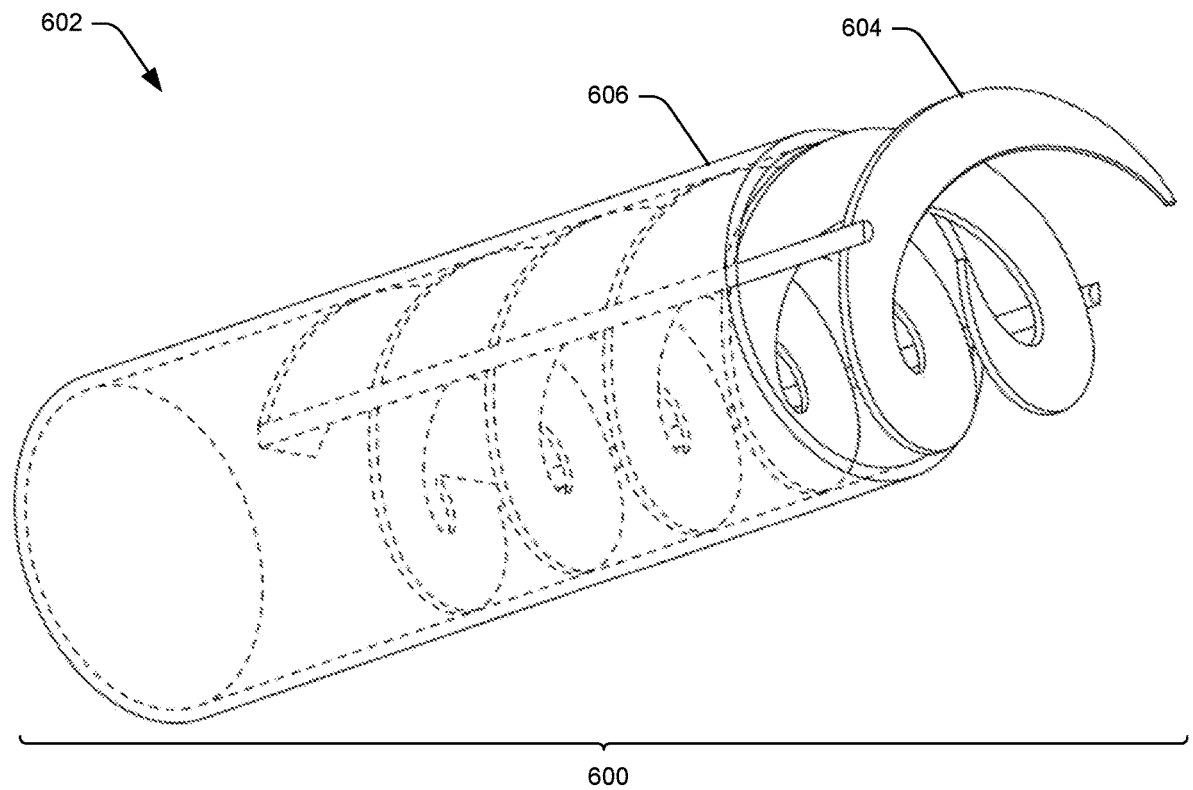
FIG. 6 illustrates a perspective view of a fish pass system according to an embodiment of this disclosure.

FIG. 6 illustrates a perspective view 600 of a fish pass system 602 according to an embodiment of this disclosure. The fish pass system 602 may be the same as any one of the fish pass systems 102, 202, 302, or 408. The fish pass system 602 including a helical blade 604 and a tube 606. The fish pass system 602 may have relatively smaller diameter helices. The entire helical blade 604 may be fabricated as one piece, which is then inserted into the tube 606. The helical blade 604 may be a single flight with tapered ends for smoother fish entry/exit. In an example, a fabrication method for forming the helical blade 604 may be 3-D printing. In the example, where the helical blade 604 is fabricated via 3-D printing, the helical blade 604 may be formed of nylon and the tube 606 may be formed of acrylic.

Figure 7:
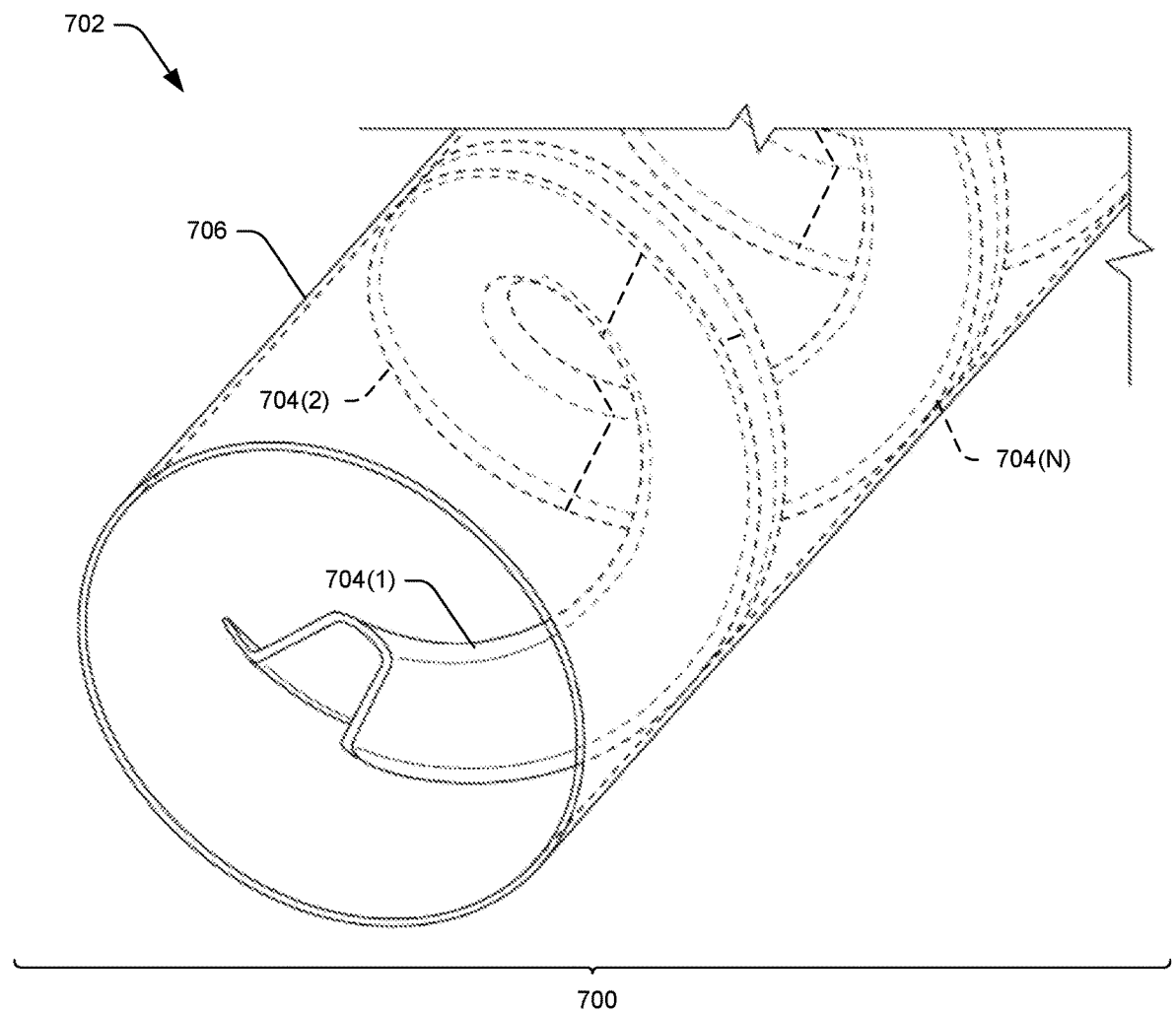
FIG. 7 illustrates a perspective view of a fish pass system according to an embodiment of this disclosure.

FIG. 7 illustrates a perspective view 700 of a fish pass system 702 according to an embodiment of this disclosure. The fish pass system 702 may be the same as any one of the fish pass systems 102, 202, 302, or 408. The fish pass system 702 may have relatively larger diameter helices. The fish pass system 702 may include flights 704(1)-704(n) or segments of flights that may be inserted/assembled into a tube 706.

Figure 8:
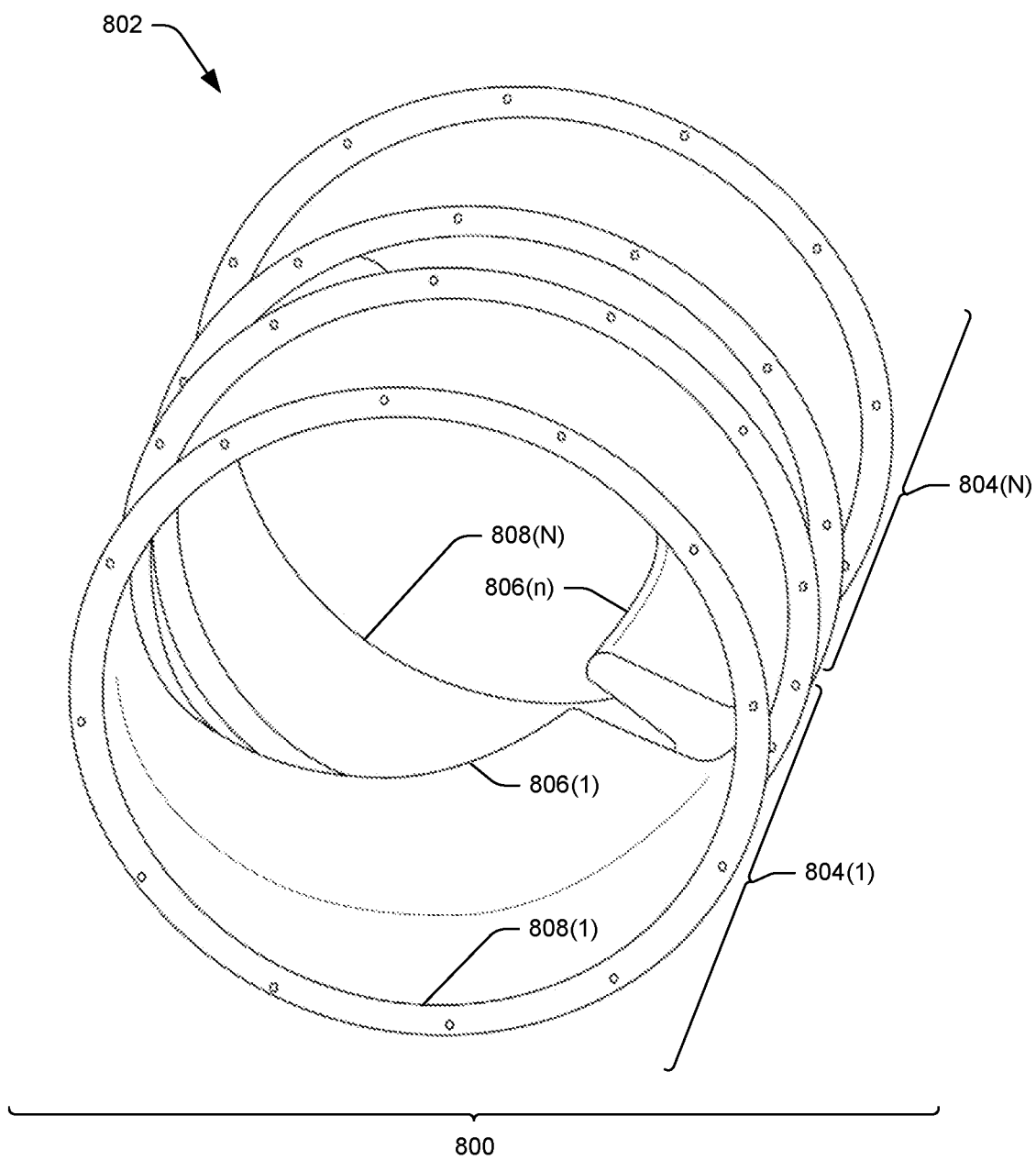
FIG. 8 illustrates a perspective view of a fish pass system according to an embodiment of this disclosure.

FIG. 8 illustrates a perspective view 800 of a fish pass system 802 according to an embodiment of this disclosure. The fish pass system 802 may be the same as any one of the fish pass systems 102, 202, 302, 408 or 702. The fish pass system 802 may have a relatively larger diameter helices. The fish pass system 802 may include full cross sections 804(1)-804(n) with helices 806(1)-806(n) fabricated as an integral part of outer tubes 808(1)-808(n). The full cross sections 804(1)-804(n) may then be fastened "stacked" on top of one another to form modules. The modules may be manufactured/stacked to meet the head drop requirements of particular riverine sites.

Figure 9:
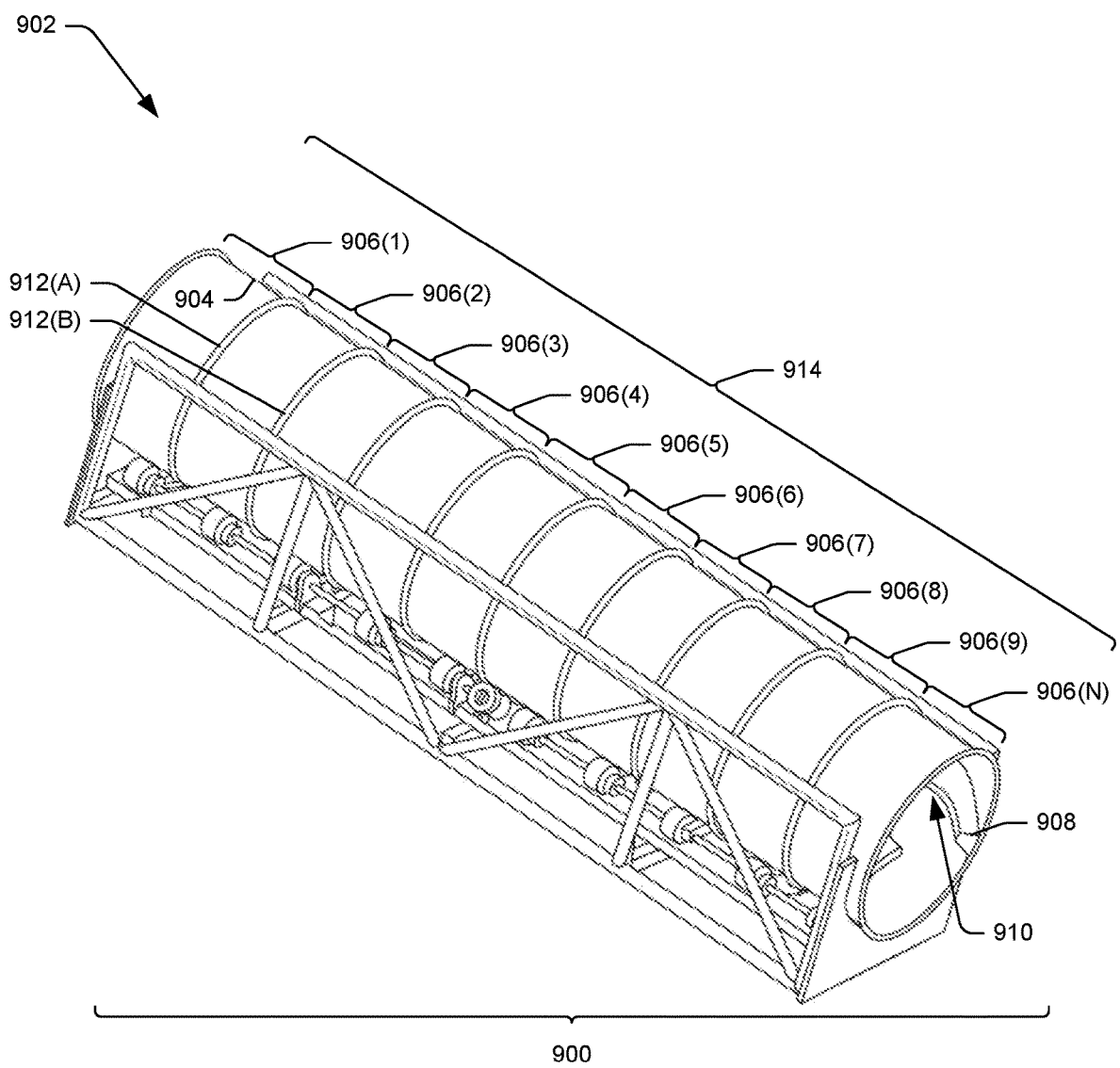
FIG. 9 illustrates a perspective view of a fish pass system according to an embodiment of this disclosure.

FIG. 9 illustrates a perspective view 900 of a fish pass system 902 according to an embodiment of this disclosure. The fish pass system 902 may be the same as any one of the fish pass systems 102, 202, 302, 408, 702, or 802. The fish pass system 902 may include an outer diameter of a tube 904 of about 3-ft, and a pitch to diameter ratio may be 1. The fish pass system 902 may include a plurality of full cross sections 906(1)-906(n). The plurality of full cross section 906(1)-906(n) may be the same as the full cross sections 804(1)-804(n). Each full cross section of the plurality full cross sections 906(1)-906(n) may contain a half-pitch segment 908 of a helical blade 910. Each full cross section of the plurality of full cross sections 906(1)-906(n) may be fabricated with flanges 912(a) and 912(b) on both ends of each full cross section of the plurality of full cross sections 906(1)-906(n). A helix component module 914 may be created by stacking the plurality of full cross sections 906(1)-906(n) together. For example, the helix component module 914 may be created by bolting, sealing, gluing, or other fastening method, the plurality of full cross sections 906(1)-906(n) together. While FIG. 9 illustrates the helix component module 914 including ten (10) full cross sections, the number of full cross sections may be chosen to meet the head requirements (or vertical elevation change) of a particular site. Here, in this example, there are 10 full cross sections (e.g., segments) to create a 15-ft long helix component module 914 (for a 7.5 ft head drop). Each full cross section segment may contain about a half-pitch of the helical blade, so there may be about 5 pitches within the helical blade. The modular nature of the design allows it to be easily extended to fit various elevation drops simply by adding more full cross section segments.

Figure 10:
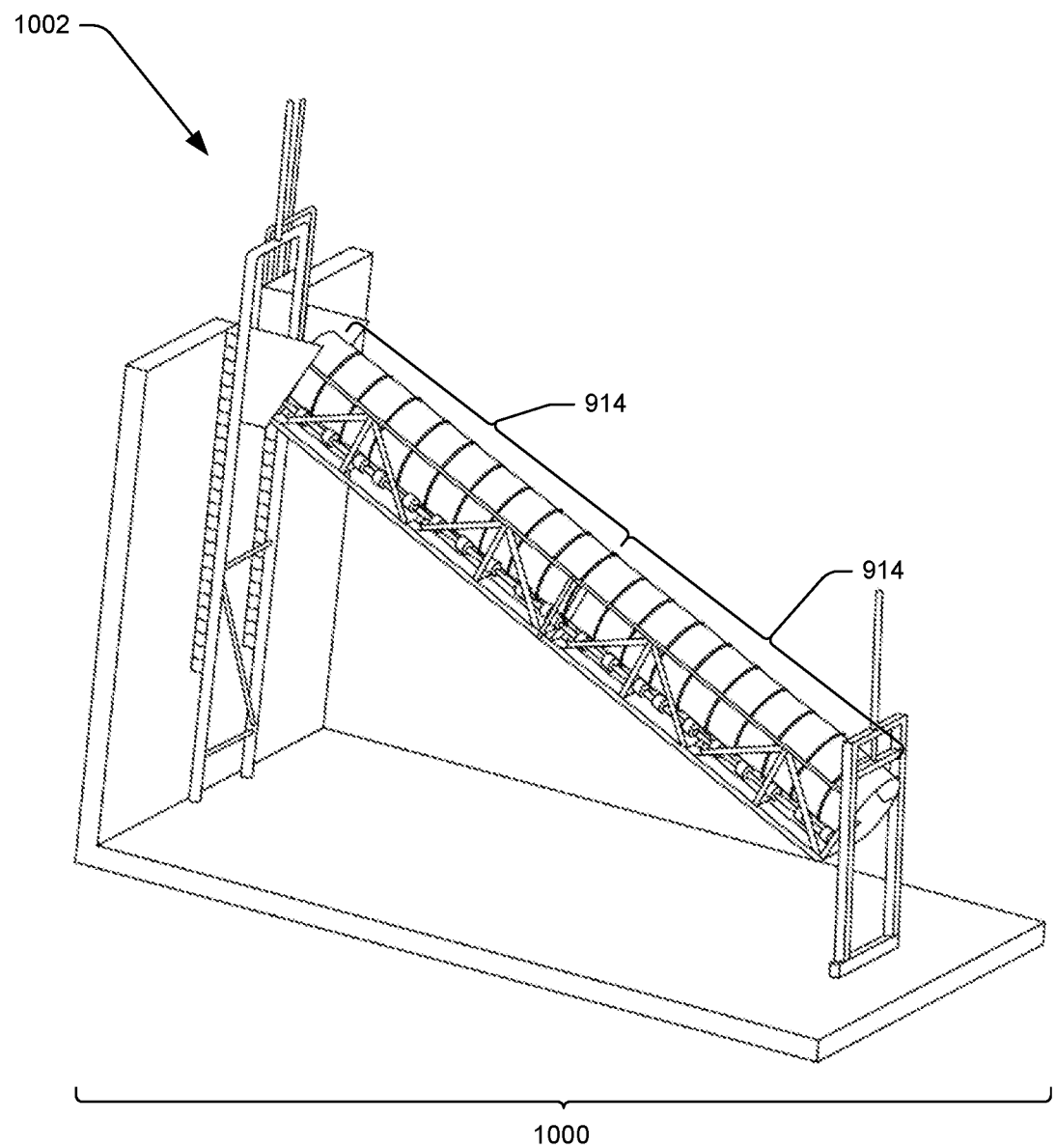
FIG. 10 illustrates a perspective view of a fish pass system according to an embodiment of this disclosure.

FIG. 10 illustrates a perspective view 1000 of a fish pass system 1002 according to an embodiment of this disclosure. The fish pass system 1002 may be the same as any one of the fish pass systems 102, 202, 302, 408, 702, 802, or 902. FIG. 10 illustrates the fish pass system 1002 may include 2 of the helix component module 914 to provide about a 30-ft long tube for about a 15-ft head drop.

Figure 11:
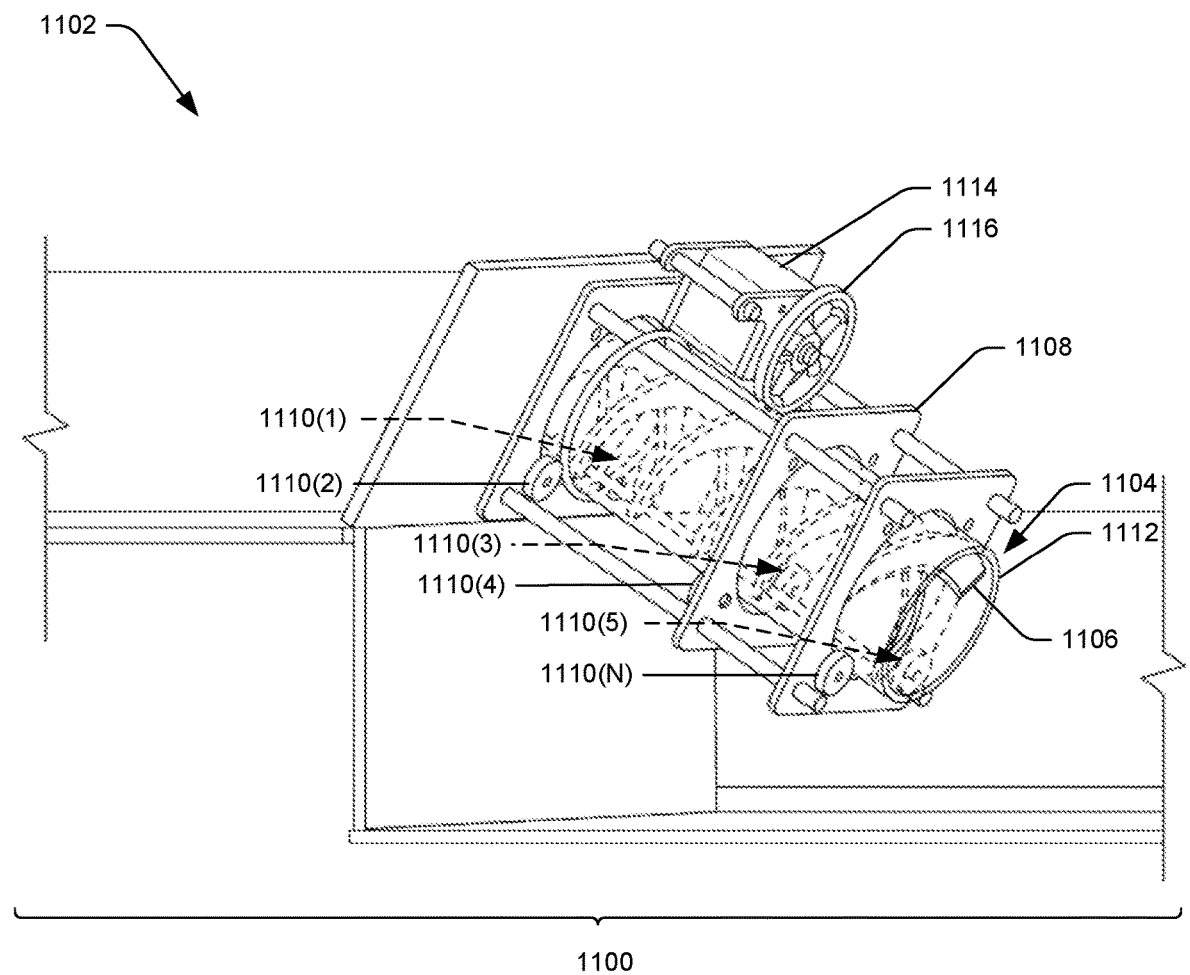
FIG. 11 illustrates a perspective view of a fish pass system according to an embodiment of this disclosure.

FIG. 11 illustrates a perspective view 1100 of a fish pass system 1102 according to an embodiment of this disclosure. The fish pass system 1102 may be the same as any one of the fish pass systems 102, 202, 302, 408, 702, 802, or 902. The fish pass system 1102 may include a tube 1104 and a helical blade 1106. The tube 1104 may be transparent. The tube 1104 may be supported by a frame 1108 at one or more points to connect the tube 1104 to the ground or foundation. The tube 1104 may be rotated by contact at one or more contact points 1110(1), 1110(2), 1110(3), 1110(4), 1110(5), and 1110(n) on an outside wall surface 1112 of the tube 1104. The rotation of the tube 1104 may be provided in various ways, including a drive belt, capstan with rollers, or drive wheels that contact the outside wall surface 1112 of the tube 1104. For example, a drive motor 1114 and drive wheel 1116 may be used to turn the tube 1104 from an upper side of the tube 1104. The physical/structural support for the tube 1104 may be provided by a separate frame.

Figure 12A:
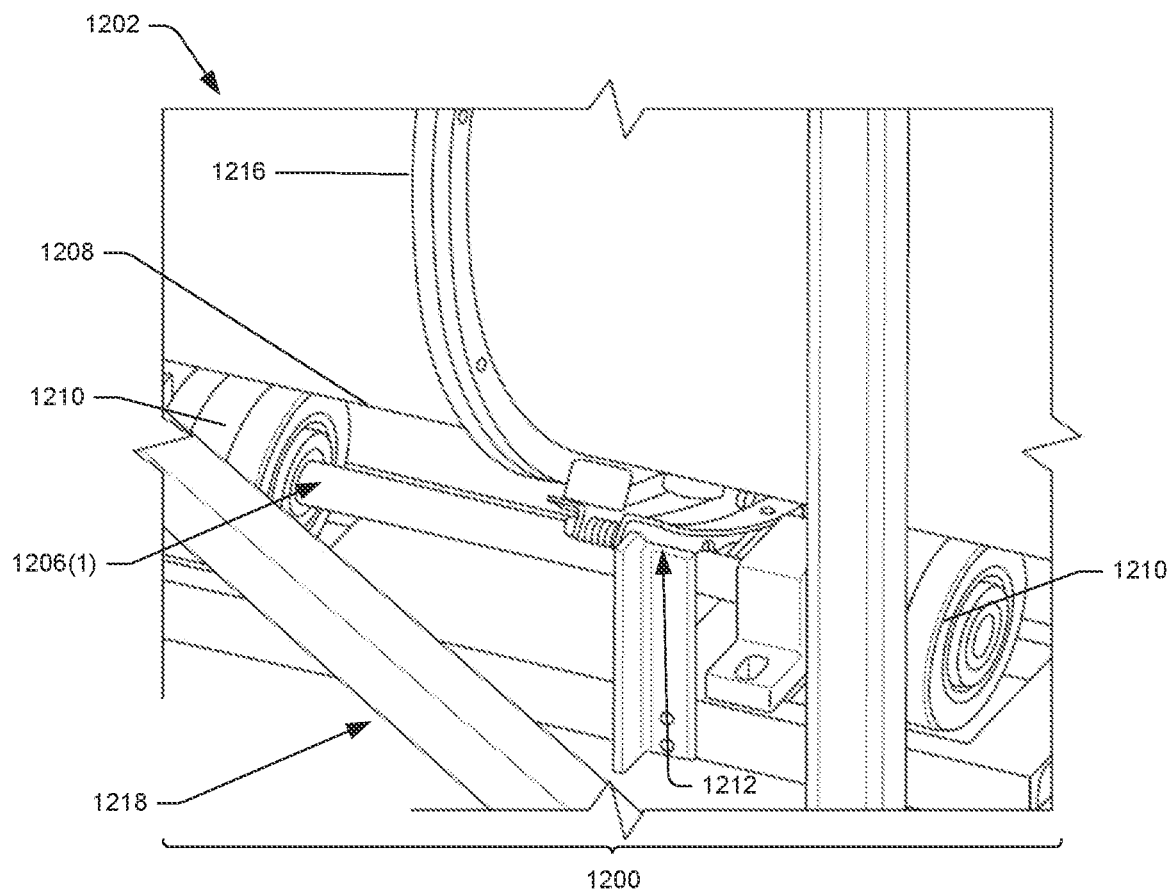
FIG. 12A illustrates a perspective view of a fish pass system according to an embodiment of this disclosure and FIG. 12B illustrates a detail view of drive shaft rods of the fish pass system.
Figure 12B:
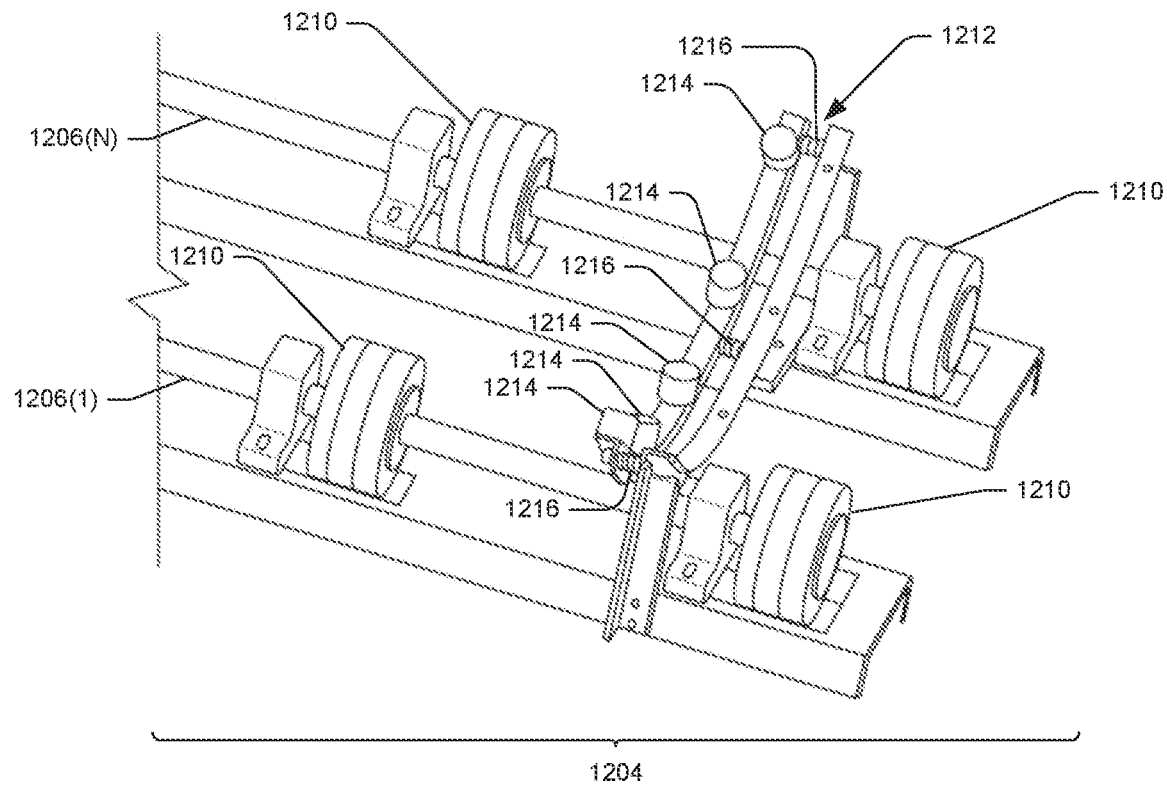

FIG. 12 illustrates a perspective view 1200 of a fish pass system 1202 according to an embodiment of this disclosure, and FIG. 12 illustrates a detail view 1204 of one or more drive shaft rods 1206(1) and 1206(n) that may be positioned underneath a tube 1208 of the fish pass system 1202. The fish pass system 1202 may be the same as any one of the fish pass systems 102, 202, 302, 408, 802, 902, 1002, or 1102. The fish pass system 1202 may include a relatively larger diameter helix component (3-ft diameter tube, 15-ft long). The one or more drive shaft rods 1206(1) and 1206(n) underneath the tube 1208 may be turned by separate motors, and the one or more drive shaft rods 1206(1) and 1206(n) may contact the tube 1208 in multiple places using a plurality of drive wheels 1210. The one or more drive shaft rods 1206(1) and 1206(n) may also support the tube 1208. A cradle may distribute the torque for driving the tube 1208 over about 20 drive wheels disposed on the one or more drive shaft rods 1206(1) and 1206(n). While FIG. 12 illustrates the one or more drive shaft rods 1206(1) and 1206(n) comprising two parallel drive shaft rods, any number of drive shaft rods may be used. For example, three parallel drive shaft rods may be used. One or more of the drive shaft rods may be driven by a motor. The motor may be about a ½ horsepower induction gear drive motor. One or more of the plurality of drive wheels 1210 may also support the radial loads from the weight of the water so there is minimal bending stress experienced by the tube 1208. The motors may be connected in parallel to a variable frequency drive. Thrust may be managed by one or more thrust assemblies 1212. For example, thrust may be managed by about five (5) thrust assemblies 1212. The one or more thrust assemblies 1212 may include multiple rollers 1214 that engage with flanges 1216 arranged with the tube 1208. For example, the one or more thrust assemblies 1212 may include multiple rollers 1214 that engage with the flanges 1216 arranged with the tube 1208. The multiple rollers 1214 may be idler wheels. The flanges 1216 may provide for connecting segments of the tube 1208. In one embodiment, the flanges 1216 may provide for connecting cross sections (e.g., plurality of cross sections 906(1)-906(n)) of the tube 1208. In another embodiment, the flanges 1216 may provide for connecting multiple helix component modules (e.g., helix component module 914).

The one or more thrust assemblies 1212 may include one or more springs 1216. The one or more thrust assemblies 1212 may be spring mounted, which may provide compliance to assure that the thrust is evenly distributed over the one or more thrust assemblies 1212. For example, the one or more thrust assemblies 1212 may be spring mounted, which may provide compliance to assure that the thrust is evenly distributed over about five (5) thrust assemblies 1212 spanning a length of the tube 1208. While FIG. 12 illustrates a fish pass system 1202 including a cradle 1218 and rotational drive mechanisms, other support structures and drive mechanisms are contemplated. For example, the cradle 1218 may be reduced in strength or may be not be required via fabricating a stronger helix component, which may allow considerable simplification of the cradle and rotational drive mechanism.

Figure 13:
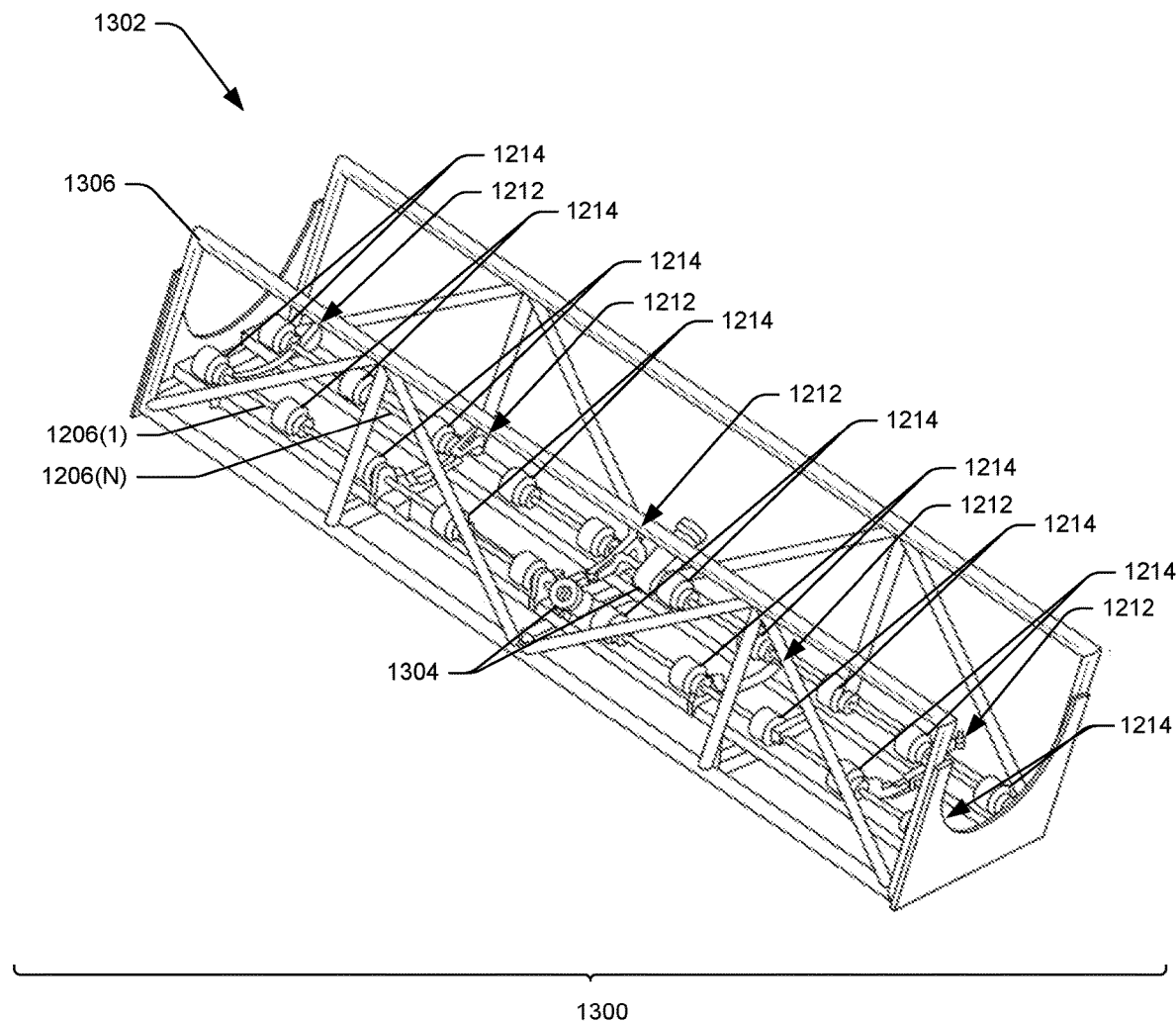
FIG. 13 illustrates a perspective view of a cradle according to an embodiment of this disclosure.

FIG. 13 illustrates a perspective view 1300 of a cradle 1302 according to an embodiment of this disclosure. The design of the cradle 1302 (e.g., support structure) for a tube and the method of attachment between the cradle 1302 and the ground or other foundation structure may be based on the strength/materials chosen for the tube. The cradle 1302 may provide a substantial "exo-skeleton" to support the outer tube of the helix and may be specifically engineered to take all of the bending and thrust loads from the helix as it is filled with water and rotates. This may provide for the helix and/or outer tube to be fabricated using additive manufacturing or other advanced manufacturing techniques (such as 3-D printing or injection molding), which may not provide much strength (particularly in the "y" direction).

The cradle 1302 may be the same as the cradle 1218. The cradle 1302 may include the one or more drive shaft rods 1206(1) and 1206(n), the one or more thrust assemblies 1212, and the multiple rollers 1214. One or more motors 1304 may drive the one or more drive shaft rods 1206(1) and 1206(n). The cradle may include a truss structure 1306. The one or more drive shaft rods 1206(1) and 1206(n), the one or more thrust assemblies 1212, the multiple rollers 1214, and/or the one or more motors 1304 may be arranged with the truss structure 1306 of the cradle 1302.

There are multiple options for the specific mechanical design/selection of each component. The outer tube and/or support structure may be strong enough to prevent bending under load and provide the appropriate surface finish and abrasion resistance for turning at one or more points along the tube. A stronger tube may allow a reduction or elimination of the cradle under the tube for structural support.

In some embodiments of this disclosure, an optimum range for rotational speed of the helix may be in the range of about 5 rpm to about 25 rpm. In some embodiments of this disclosure, an optimum/acceptable water elevation over each "weir" crest or blade in the center of the tube (the water level above the inner radius of the helix) may depend on the fish species known to be present at that particular river or other water site. Larger depth fish are expected to need a larger depth of water over the blade to safely pass without scale damage. The minimum depths required by NOAA for weir/ladder type fish passages are up to 12 inches, for species such as adult salmon. However, the helix may be made very smooth and specifically shaped for fish to pass over. Further, these minimum depth criteria are based on the need for fish to jump over a weir or between pools, and no jumping is required for passage through this device. Thus, it may be possible to have less water depth over the inner helix while still safely passing fish. The water depth over each blade or turn of the helix may be controlled/varied by adjusting the inlet water height, the ratio of the inner diameter of the helix to the outer diameter, and/or other variables.

In some embodiments of this disclosure, an optimum/acceptable location of the upstream and downstream ends of the helix under the water surface elevation (the vertical distance the ends should be "under water" to operate) may be at or less than the centerline of the tube containing the helix or helices. For fish to be able to enter and exit both upstream and downstream ends, the fish need to be able to access the passageway at both ends. The actual immersion depth from the surface at the upstream end affects the flowrate and water height over the inner helix, and other variables. The immersion depth at the downstream end may be less critical for performance of the fish passage but may be selected or optimized based on fish behavior. These immersion depths, relative to the upstream and downstream surface elevations, may be controlled either manually or automatically, depending on the characteristics of each waterway.

In some embodiments of this disclosure, an acceptable angle for the tube containing the helix may be an angle of about 20-30 degrees from horizontal. However, it is contemplated that a broader operating range possibly from about 15 to 45 degrees, may be an acceptable angle for the tube containing the helix or helices.

The fish pass system may be rotated by a motor that could have a separate power source (including but not limited to solar/batteries) other than on-site hydropower. Thus, the fish pass system may be used at any location there is a drop or disconnect in the waterway (such as a culvert or weir), not just for hydro-plants. When not rotating, the fish pass system may still transfer water and fish downhill and may provide uphill passage to some species.

The rotation of the fish pass system may be intentionally stopped during certain periods to prevent certain species from migrating. The rotation of the fish pass system may be intentionally reversed for some period to clear debris or prevent certain species from migrating.

The fish pass system may be made of a series of helical fish passes to accommodate significantly higher head changes. The series of helical fish passes may be oriented at various angles to each other and provide resting "pools" at various elevations for fish exiting one helical fish pass section before entering the next. In this embodiment, each helical fish pass may be rotated independently.

Figure 14A:
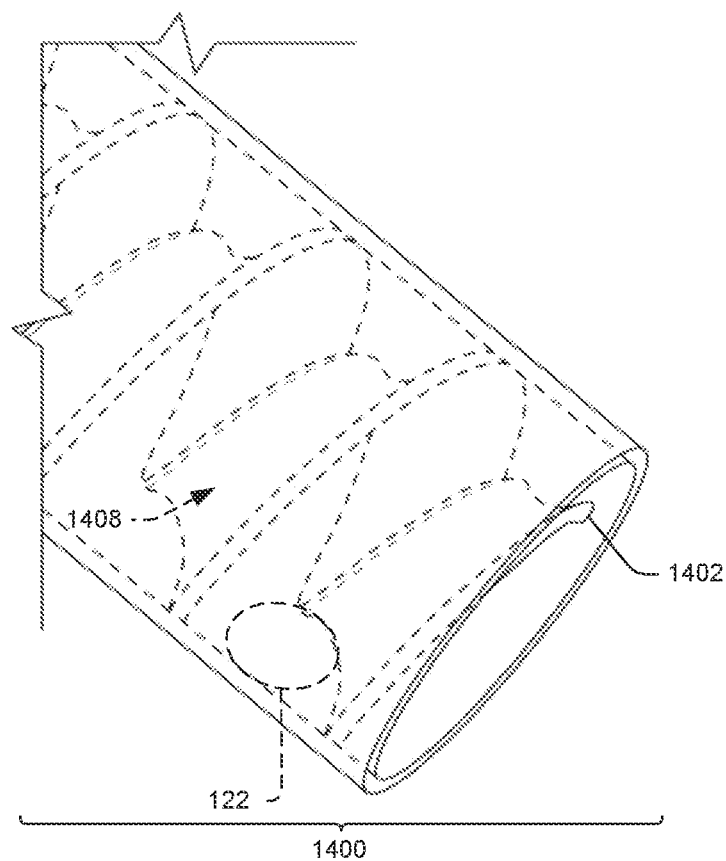
FIGS. 14A and 14B illustrate perspective views of helical blades according to embodiments of this disclosure.
Figure 14B:
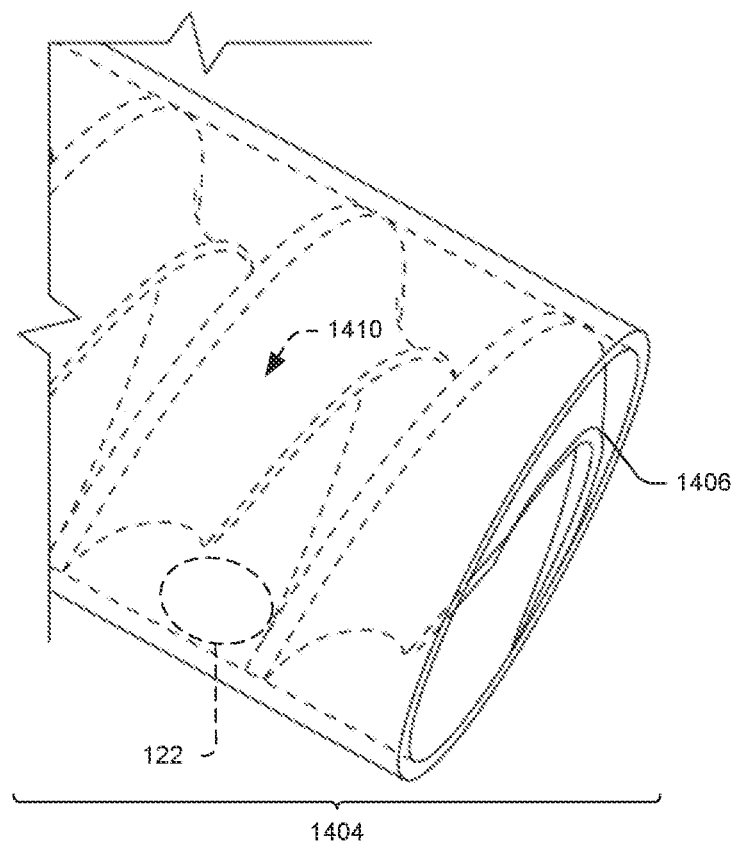

FIG. 14 illustrates a perspective view 1400 of a helical blade 1402 according to an embodiment of this disclosure, and FIG. 14 illustrates a perspective view 1404 of another helical blade 1406 according to an embodiment of this disclosure. Perspective view 1400 illustrates the helical blade 1402 may include a cupped blade 1408 where the inner radius of the helix turns over on itself to better encourage upstream fish to remain in the space 122 (e.g., "bucket") as it travels uphill, and not "jump" between buckets and possibly fall back downstream through the open center passage. Perspective view 1402 illustrates the other helical blade 1406 may include an inverted cupped blade 1410 where the inner radius of the helix turns over on itself so that the inverted cupped blade 1410 turns over downstream, which may provide a smoother passage for downstream fish (and less likely downstream traveling fish could end up being transported by an upstream bucket). While FIG. 14 illustrates cupped blades, the blades of the helix may be bifurcated at the inner radius such that it cups both ways. Similarly, different sections along the length of the helix could be shaped or cupped differently and the entrance and exit may have a different shape or "view factor" for approaching fish.

Figure 15A:
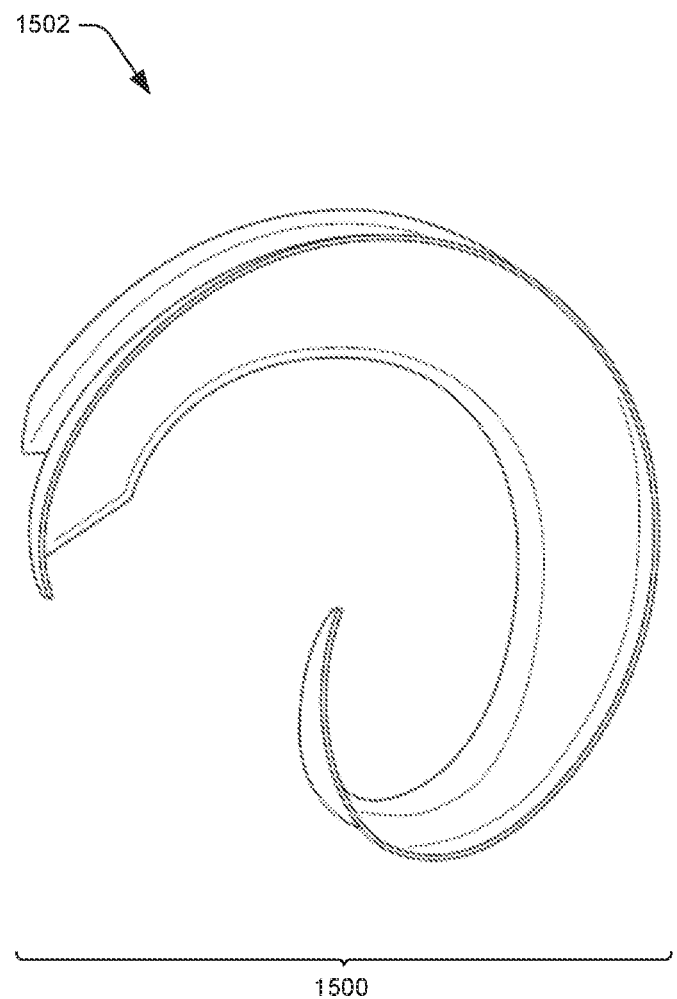
FIGS. 15A and 15B illustrate perspective views of blade segments according to embodiments of this disclosure.
Figure 15B:
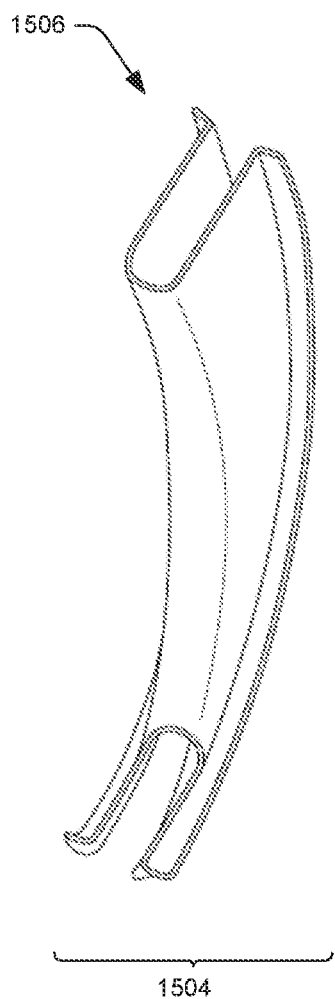

FIG. 15 illustrates a perspective view 1500 of a blade segment 1502 according to an embodiment of this disclosure, and FIG. 15 illustrates a perspective view 1504 of another blade segment 1506. The blade segments 1502 and 1506 may be the same as one or more of the plurality of blade segments 128(1)-128(n). The blade segments 1502 and 1506 may be formed using vacuum bag, open molding, rotational molding, injection molding, light resin transfer molding or other technique. The blade segments 1502 and 1506 may be fabricated using additive manufacturing processes (such as 3-D printing). In one example, the blade segments 1502 and 1506 may include a foam or other solid core. In another example, the blade segments 1502 and 1506 may be hollow or solid.

Figure 16A:
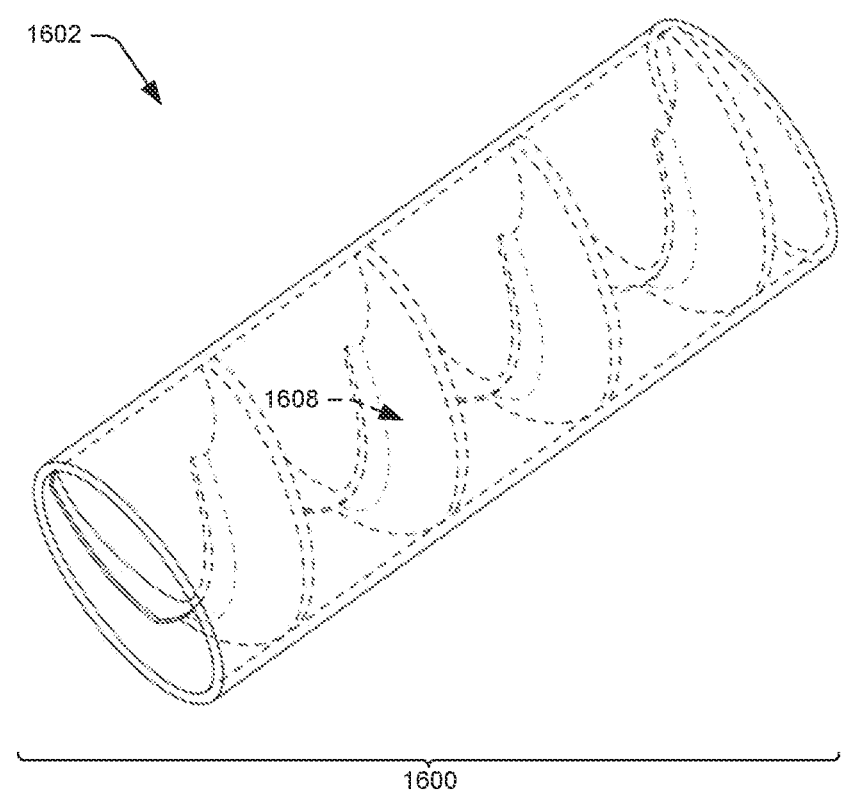
FIGS. 16A and 16B illustrate perspective views of blade segments according to embodiments of this disclosure.
Figure 16B:
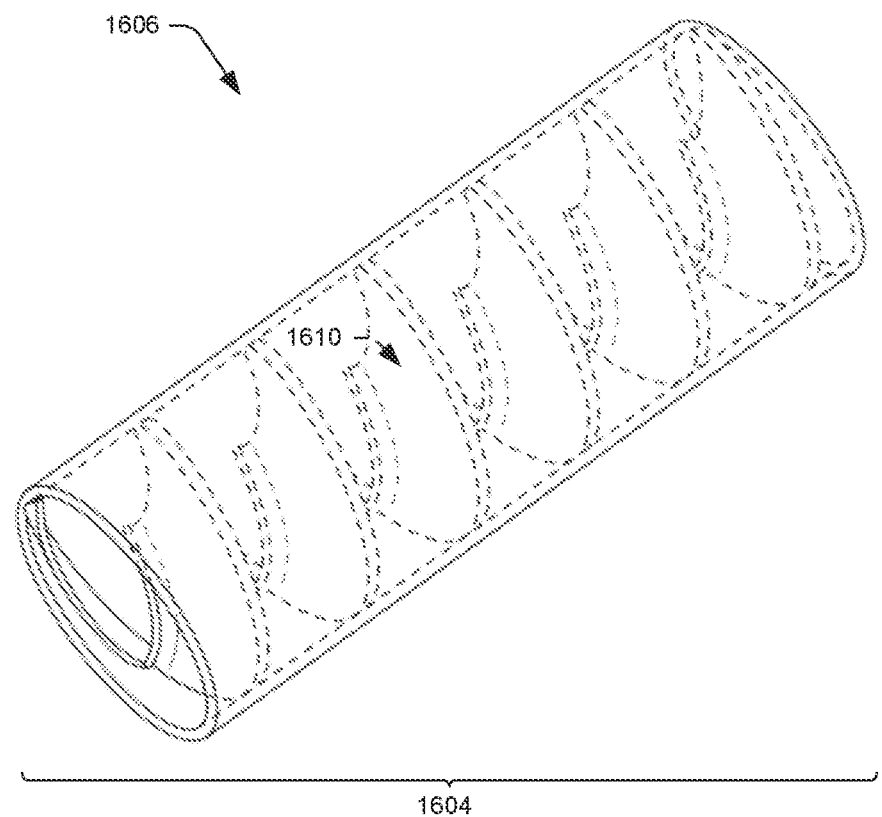

FIG. 16 illustrates a perspective view 1600 of a helical blade 1602 according to an embodiment of this disclosure, and FIG. 16 illustrates a perspective view 1604 of another helical blade 1606 according to an embodiment of this disclosure. Perspective view 1600 illustrates the helical blade 1602 may include a cup-shaped blade 1608 with a larger diameter of the cup facing upward. Perspective view 1604 illustrates the helical blade 1606 may include a cup-shaped blade 1610 with a larger diameter of the cup facing upward, but with a 50% shorter pitch than the pitch of the helical blade 1602.

Figure 17:
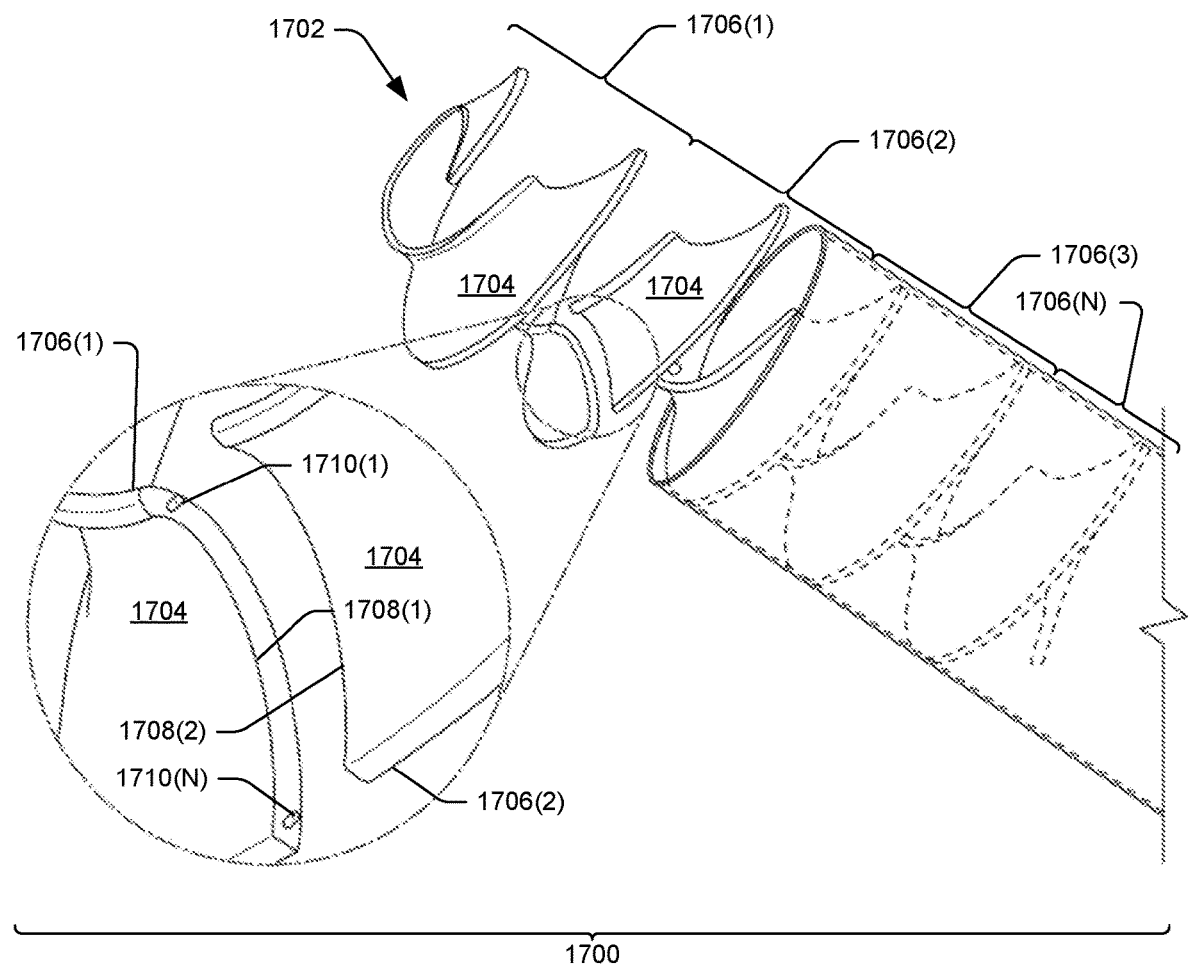
FIG. 17 illustrates a perspective view of a helical blade according to embodiments of this disclosure.

FIG. 17 illustrates a perspective view 1700 of a helical blade 1702 according to an embodiment of this disclosure.

The helical blade 1702 may include a cup-shaped blade 1704 with a larger diameter of the cup facing upward. FIG. 17 illustrates the helical blade 1702 including the cup-shaped blade 1704 having the enhanced cupped helical design which may be fabricated without connecting "rails" between the respective blades. For example, the helical blade 1702 including the cup-shaped blade 1704 having the enhanced cupped helical design may be fabricated without the rails of the helical blade 604 illustrated in FIG. 6. FIG. 17 illustrates the helical blade 1702 may include a plurality of blade sections 1706(1)-1706(n). Each of the blade sections 1706(1)-1706(n) may include the cup-shaped blade 1704 having the enhanced cupped helical design. The blade sections 1706(1)-1706(n) may be manufactured via 3D printing. The blade sections 1706(1)-1706(n) may be fastened (e.g., coupled, mated, assembled etc.) together. For example, the blade sections 1706(1)-1706(n) may be fastened together from respective sides 1708(1) and 1708(2) of the blades sections 1706(1)-1706(n) via one or more pins or dowels 1710(1)-1710(n). For example, the blade sections 1706(1)-1706(n) may be fastened together from respective sides 1708(1) and 1708(2) of the blade sections 1706(1)-1706(n) via one or more pins or dowels 1710(1)-1710(n) glued-in place in the sides of the blade sections 1706(1)-1706(n). The one or more pins or dowels 1710(1)-1710(n) may be formed of metal (e.g., steel, stainless steel, aluminum, brass, titanium, etc.) or other material. While FIG. 17 illustrates the blade sections 1706(1)-1706(n) fastened together via one or more dowels 1710(1)-1710(n), the blade sections 1706(1)-1706(n) fastened together via bolting, sealing, gluing, or other fastening method. While FIG. 7 illustrates the helical blade 1702 including four (4) blade sections, the helical blade 1702 may include any number of blade sections. For example, the number of blade sections may be chosen to meet the head requirements (or vertical elevation change) of a particular site.

Figure 18:
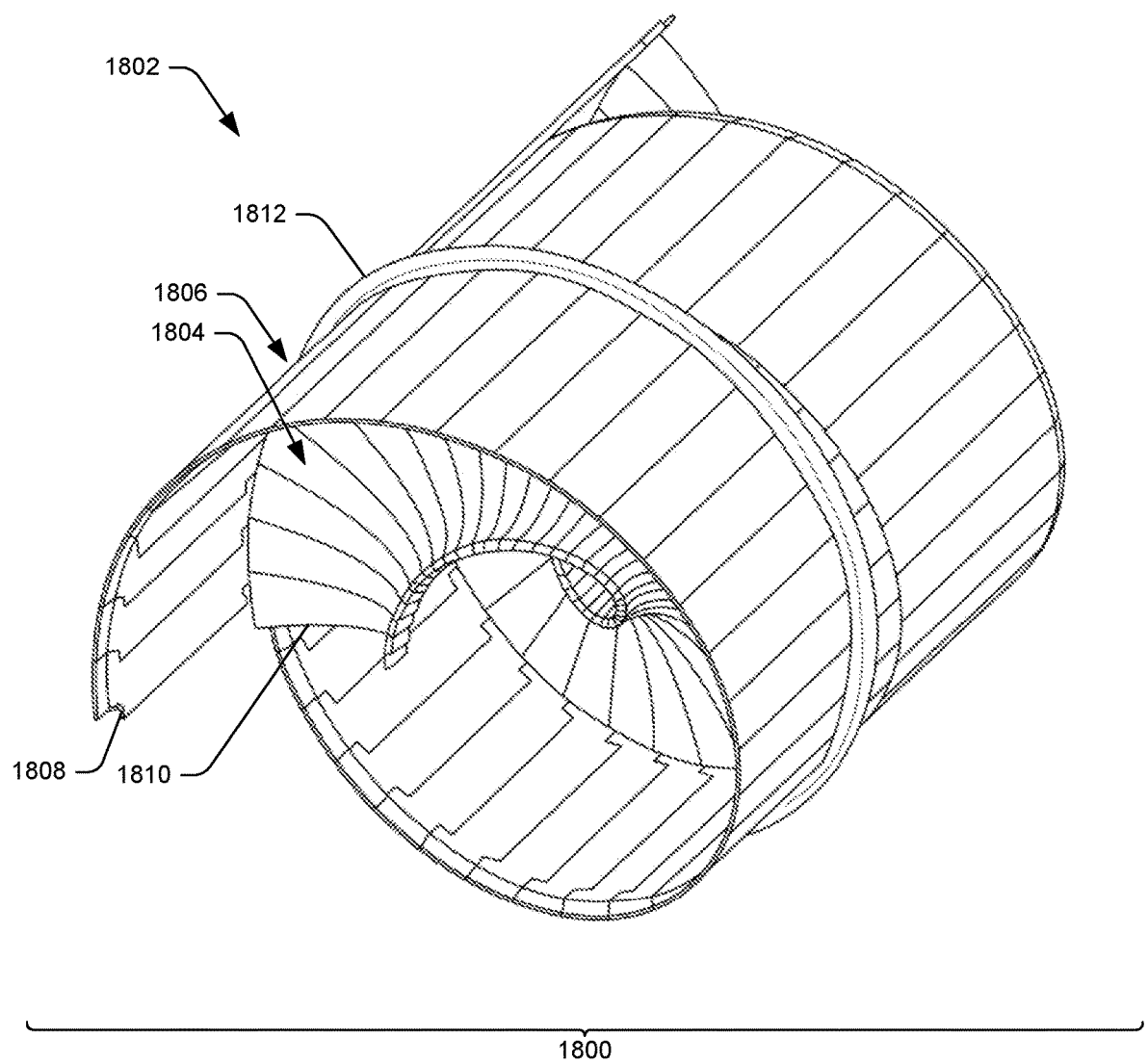
FIG. 18 illustrates a perspective view of a fish pass system according to embodiments of this disclosure.

FIG. 18 illustrates a perspective view 1800 of a fish pass system 1802 according to embodiments of this disclosure. The fish pass system 1802 may be the same as any one of the fish pass systems 102, 202, 302, 408, 702, 802, 902, 1002, or 1102. The fish pass system 1802 may include a helical blade 1804 and a tube 1806. The tube 1806 may include a plurality of cylinder slats 1808. The helical blade 1804 may include a plurality of helical blade segments 1810. Each of the plurality of cylinder slats 1808 and each of the plurality of helical blade segments 1810 may be relatively smaller parts that permit fabrication and/or assembly via plastic injection molding (PIM), where the relatively smaller parts can be cost effectively made at high volume.

The plurality of cylinder slats 1808 may be fastened (e.g., coupled, mated, assembled etc.) together via overlapping respective portions of each cylinder slat 1808. For example, the plurality of cylinder slats 1808 may be fastened together via overlapping respective tongue and groove portions of each cylinder slat 1808.

The plurality of helical blade segments 1810 may be fastened together via overlapping respective portions of each blade segment 1810. For example, the plurality of helical blade segments 1810 may be fastened together via overlapping respective tongue and groove-like portions of each helical blade segment 1810.

The plurality of helical blade segments 1810 may be fastened together with the plurality of cylinder slats 1808. For example, each cylinder slat of the plurality of cylinder slats 1808 may include a groove capable of receiving a respective tongue of a helical blade segment of the plurality of helical blade segments 1810. In this way, the fish pass system 1802 may be assembled together without installing the plurality of helical blade segments 1810 within a separate outer tube. One or more hoops 1812 may be fastened around the outside surface of the tube 1806 and along the vertical axis. For example, the one or more hoops 1812 may be fastened around the outside surface of the plurality of helical blade segments 1810 forming the tube 1806 much like hoops around barrel staves. The one or more hoops 1812 may provide for interfacing with a drive/contact system for rotating the helix. For example, the one or more hoops 1812 may provide for interfacing with the thrust assemblies 1212 illustrated in FIG. 12 for rotating the tube 1806 of the fish pass system 1802.

The plurality of cylinder slats 1808 may be formed of a plastic. Alternatively, the plurality of cylinder slats may be formed of composite, metal, wood, etc. In an embodiment, the plurality of cylinder slats 1808 may be formed of mineral filled Acrylonitrile Butadiene Styrene (ABS) or foam filled ABS. In such an embodiment, the plurality of cylinder slats 1808 may thus be assembled using ABS adhesive. The plurality of cylinder slats 1808 may include fastening features such as tabs to facilitate fit up and gluing the plurality of cylinder slats 1808 together. Additionally, one or more hot tips may be built into each mold to facilitate the molding process.

Likewise, the plurality of helical blade segments 1810 may be likewise formed of a plastic, composite, metal, wood, etc. In an embodiment, the plurality of helical blade segments 1810 may be formed of mineral filled ABS or foam filled ABS. In such an embodiment, the plurality of helical blade segments 1810 may be assembled with ABS or another adhesive. The plurality of helical blade segments 1810 may include fastening features such as tabs to facilitate fit up and facilitate gluing the plurality of helical blade segments 1810 together. In an embodiment, one or more hot tips may be built into each mold to facilitate the molding process. Further, the plurality of helical blade segments 1810 may be assembled with the plurality of cylinder slats 1808 via ABS or another adhesive. Assembling the plurality of helical blade segments 1810 with the plurality of cylinder slats 1808 may include alternating assembly of the plurality of cylinder slats 1808 and the plurality of helical blade segments 1810.

For about a 3-ft diameter helix, each cylinder slat of the plurality of cylinder slats 1808 may be about 3 inches wide, and each helical blade segment of the plurality of helical blade segments 1810 may be about 6 inches wide at the base where it meets the cylinder slat. Because the helical blade 1804 is formed as an integrated component with the tube 1806, an improved strength, particularly in bending, along the length of the tube 1806 due to increased wall thickness and choice of material is realized, which may provide for a supporting cradle assembly to be simplified. Further, because the helical blade 1804 is formed as an integrated component with the tube 1806, smooth finished surfaces on all sides are realized, which may provide for no post-production surface process to finish the surfaces. Further, because the helical blade 1804 is formed as an integrated component with the tube 1806, a separate outer tube is not required which avoids a need for a separate outer tube having tight tolerances for fit-up with an inserted blade assembly, and eliminates a need to develop and use separate tooling to locate and "pin" the helical blades from the outside of the tube.

Figure 19:
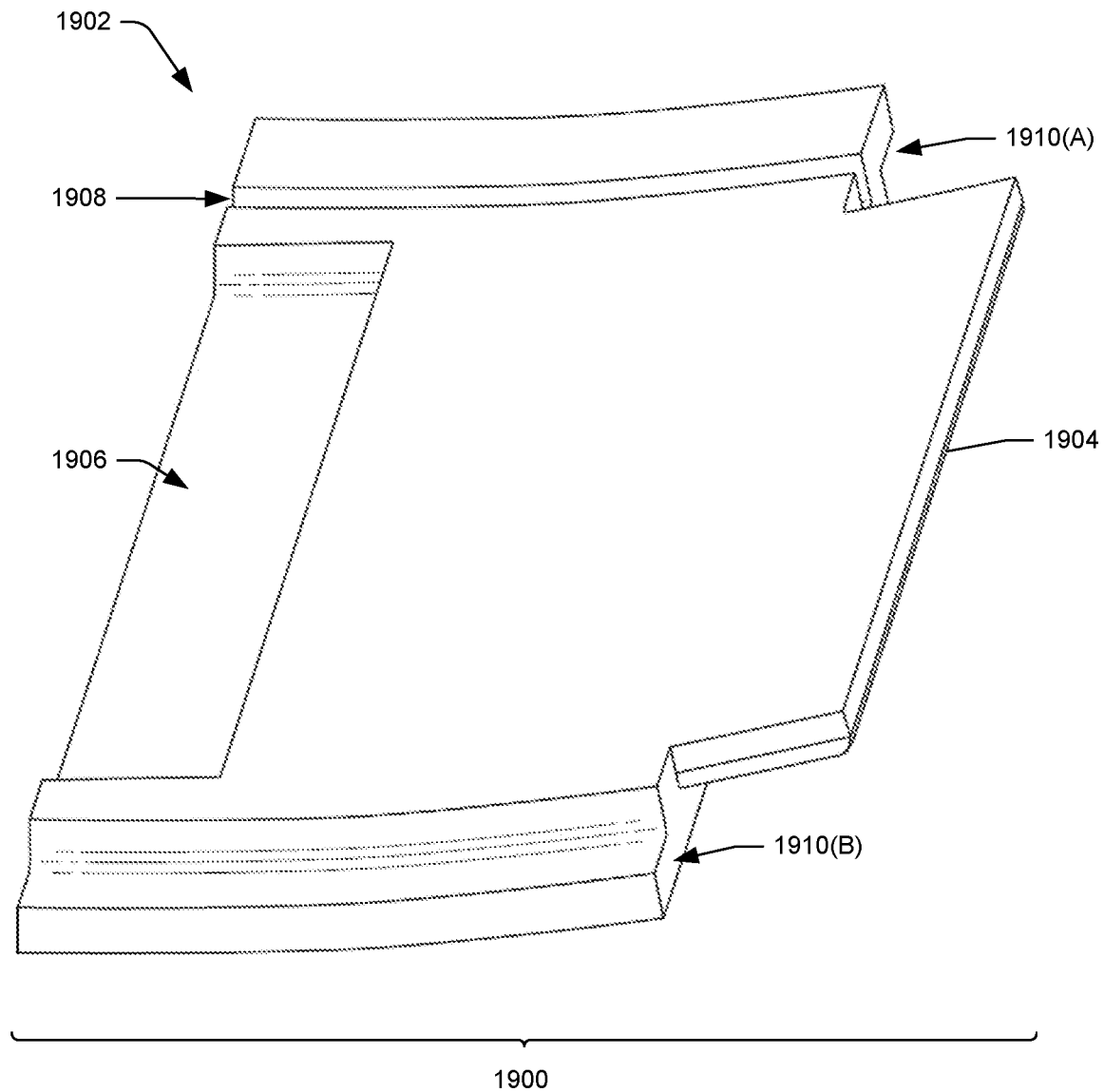
FIG. 19 illustrates a perspective view of a cylinder slat according to embodiments of this disclosure.

FIG. 19 illustrates a perspective view 1900 of a cylinder slat 1902 according to embodiments of this disclosure. The cylinder slat 1902 may be the same as a cylinder slat of the plurality of cylinder slats 1808. The cylinder slat 1902 may include a tongue 1904 disposed on a first end of the cylinder slat 1902 and a groove 1906 arranged in a second end of the cylinder slat 1902 opposite the first end of the cylinder slat 1902. The groove 1904 may provide for receiving a tongue of an adjacent cylinder slat. The tongue 1904 may be received by a groove of an adjacent cylinder slat. The cylinder slat 1902 may include a slot 1908 arranged in a side of the cylinder slat 1902 between the first and second ends of the cylinder slat 1902. The slot 1908 may receive a base portion of a helical blade segment of the plurality of helical blade segments 1810. The cylinder slat 1902 may include connection members 1910(*a*) and 1910(*b*) arranged between the first and second ends of the cylinders slat 1902. The connection members 1910(*a*) and 1910(*b*) may receive connection members of adjacent cylinder slats.

Figure 20:
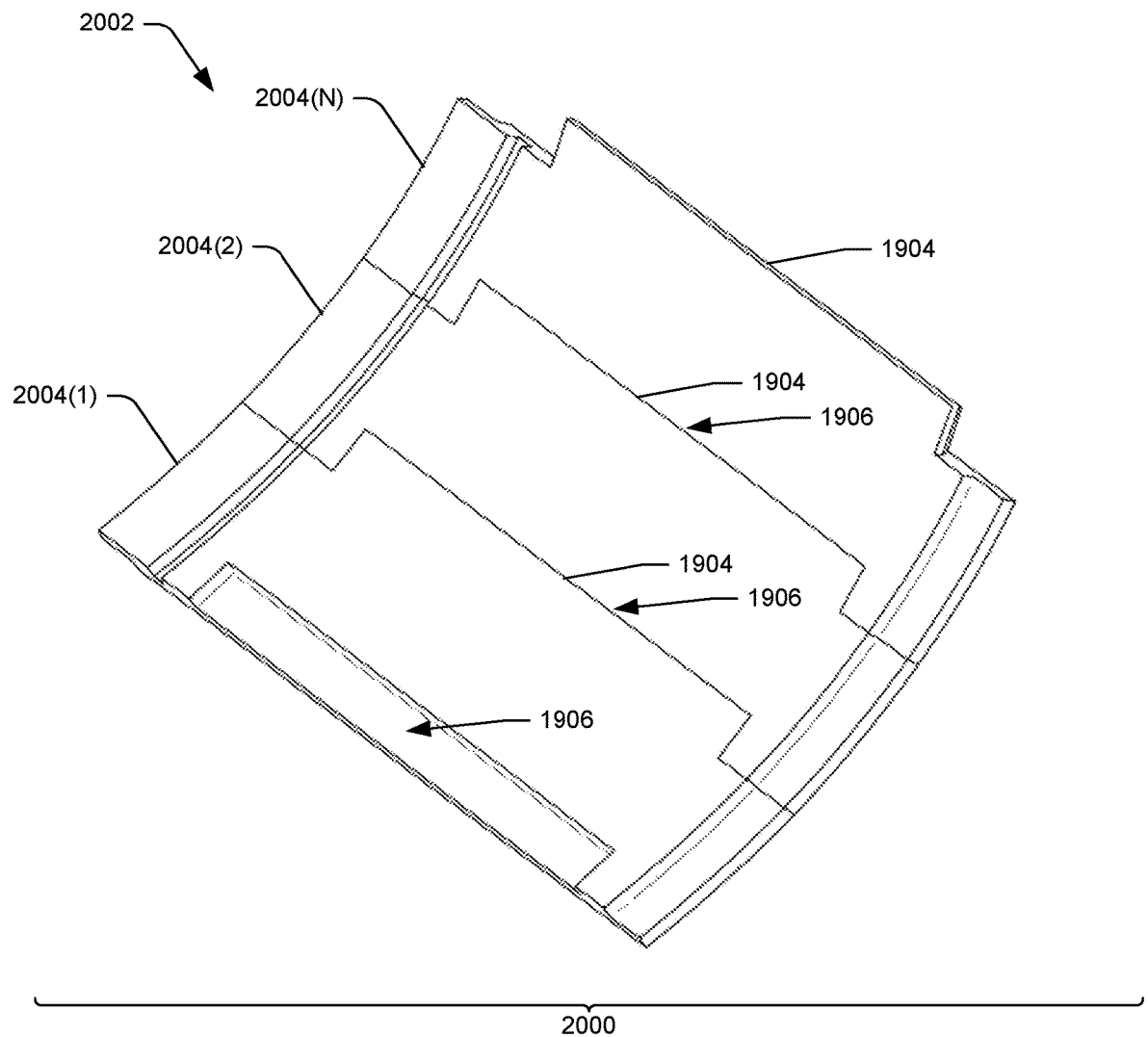
FIG. 20 illustrates a perspective view of an assembly of a plurality of cylinder slats according to embodiments of this disclosure.

FIG. 20 illustrates a perspective view 2000 of an assembly 2002 of a plurality of cylinder slats **2004(1)-204(*n*) according to embodiments of this disclosure. The plurality of cylinder slats 2004(1)-204(*n*) may be the same as the plurality of cylinder slats 1808. FIG. 20 illustrates the tongue 1904 of the cylinder slat 2004(1) received by the groove 1906 of the cylinder slat 2004(2) and the tongue 1904 of the cylinder slat 2004(2) received by the groove 1906 of the cylinder slat 2004(*n*)**.

Figure 21:
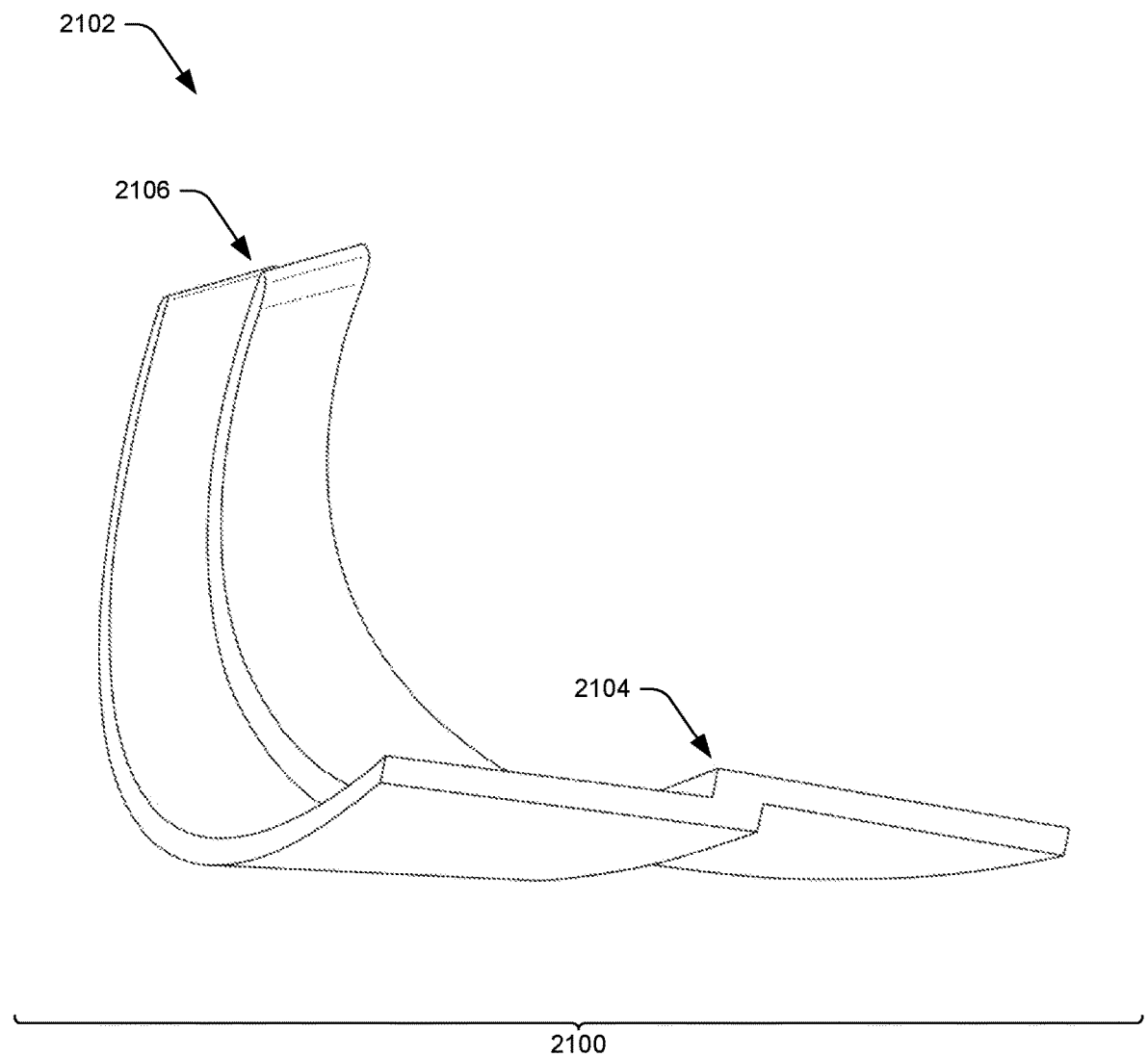
FIG. 21 illustrates a perspective view of a helical blade segment according to embodiments of this disclosure.

FIG. 21 illustrates a perspective view 2100 of a helical blade segment 2102 according to embodiments of this disclosure. The helical blade segment 2102 may be the same as a helical blade segment of the plurality of helical blade segments 1810. The helical blade segment 2102 may include a base portion 2104 opposite a top portion 2106. The base portion 2104 of the helical blade segment 2102 may be received by the slot 1908 arranged in the cylinder slat 1902.

Figure 22:
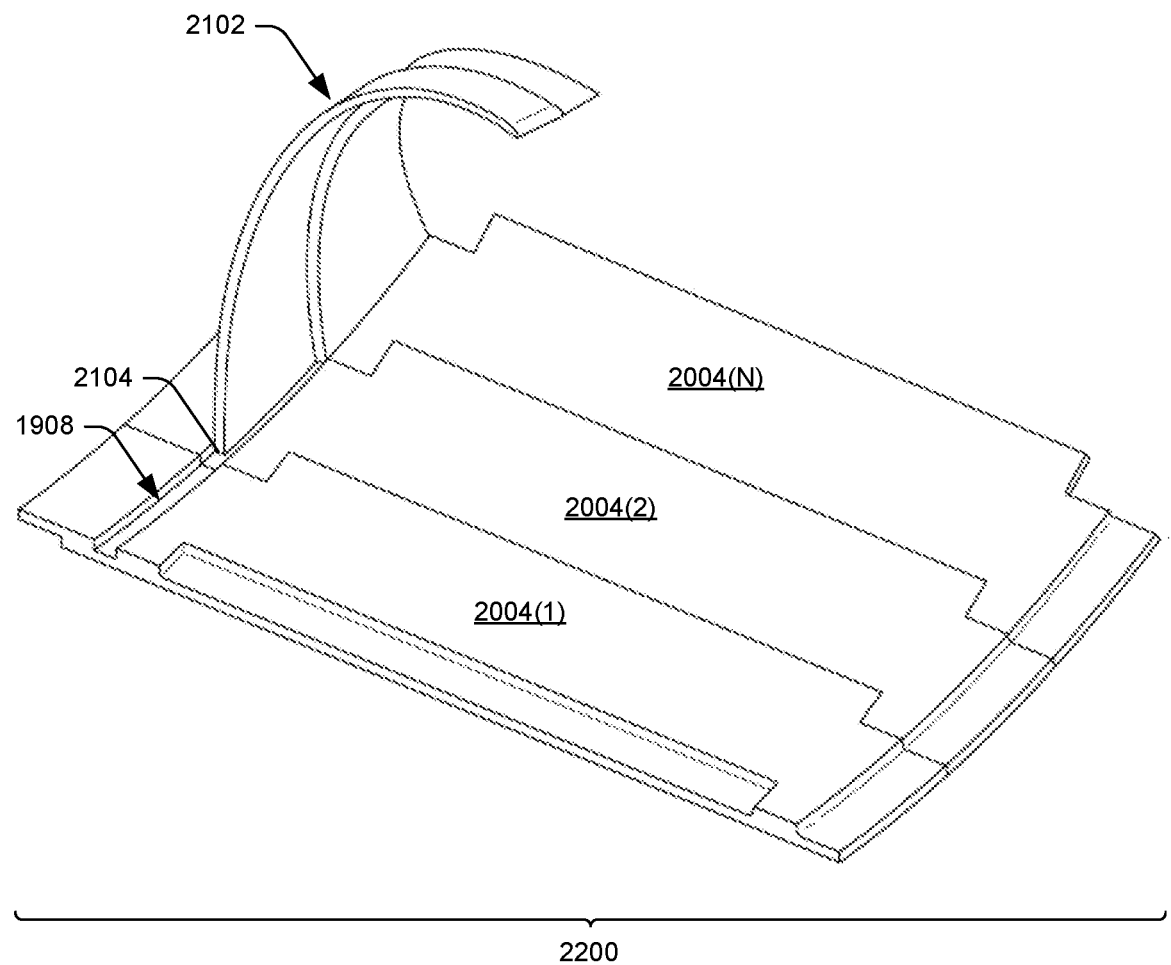
FIG. 22 illustrates a perspective view of the helical blade segment of FIG. 21 assembled with the plurality of cylinder slats of FIG. 20 according to embodiments of this disclosure.

FIG. 22 illustrates a perspective view 2200 of the helical blade segment 2102 assembled with the plurality of cylinder slats 2002 according to embodiments of this disclosure. FIG. 22 illustrates the base portion 2104 of the helical blade segment 2102 received by the slots 1908 arranged in the plurality of cylinder slats 2004(2) and **204(*n*)**.

Figure 23:
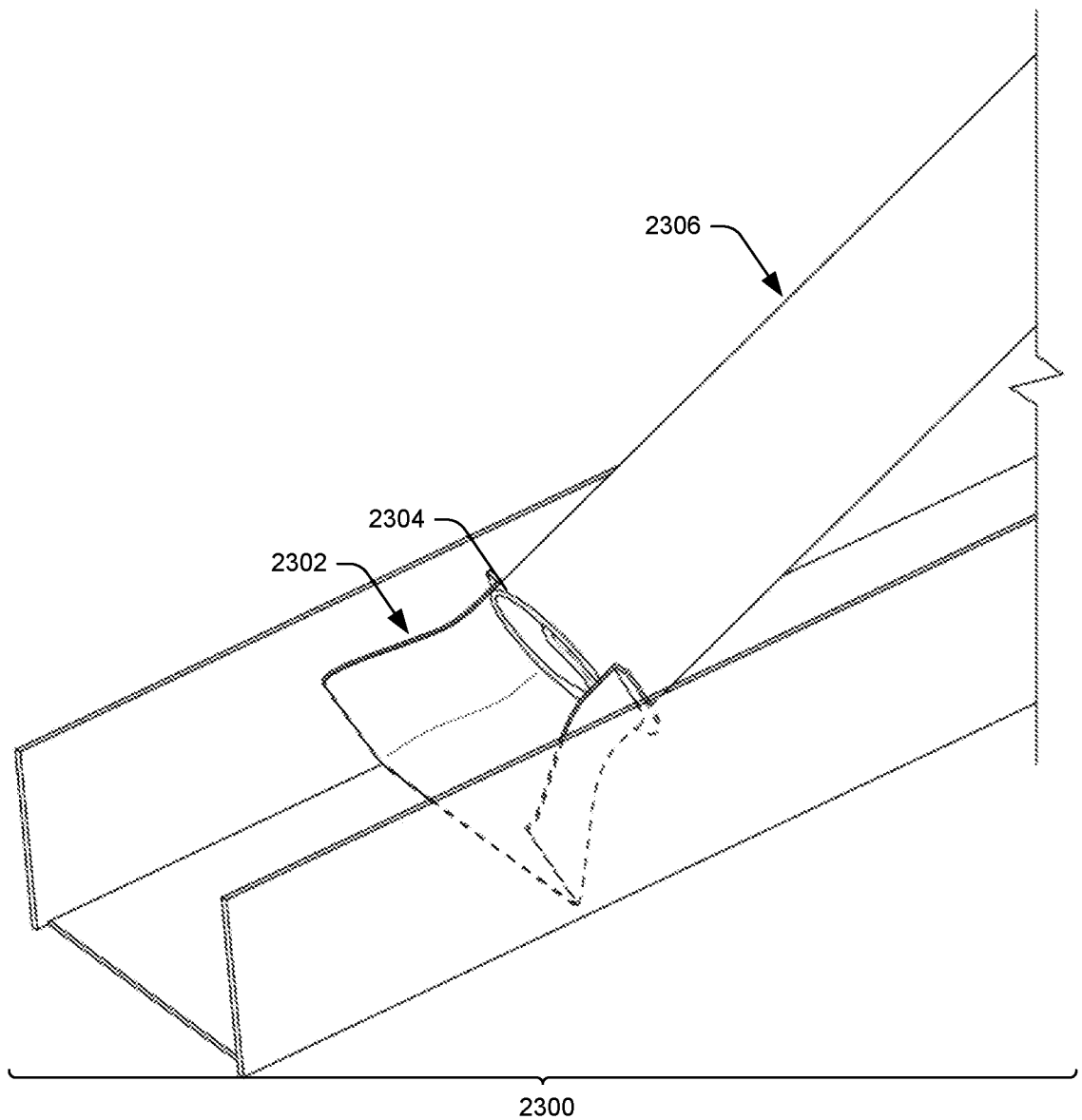
FIG. 23 illustrates a perspective view of a downstream transition according to embodiments of this disclosure.

FIG. 23 illustrates a perspective view 2300 of a downstream transition 2302 according to embodiments of this disclosure. The downstream transition 2302 may be disposed at a downstream end 2304 of a fish pass system 2306. The fish pass system 2306 may be the same as any one of the fish pass systems 102, 202, 302, 408, 802, 902, 1002, 1102, or 1802. The downstream transition 2302 may provide for volitional passage for fish. Because of the bi-directional nature of the fish pass systems described herein, the downstream transition 2302 may provide for both an entrance and/or exit to the fish pass system 2306, depending upon whether the fish desires to travel upstream or downstream. The downstream transition 2302 may provide for directing fish into the downstream end 2304 of the helix by providing a relatively smooth funnel-like trough as a transition into (or out of) a rotating helix.

Figure 24:
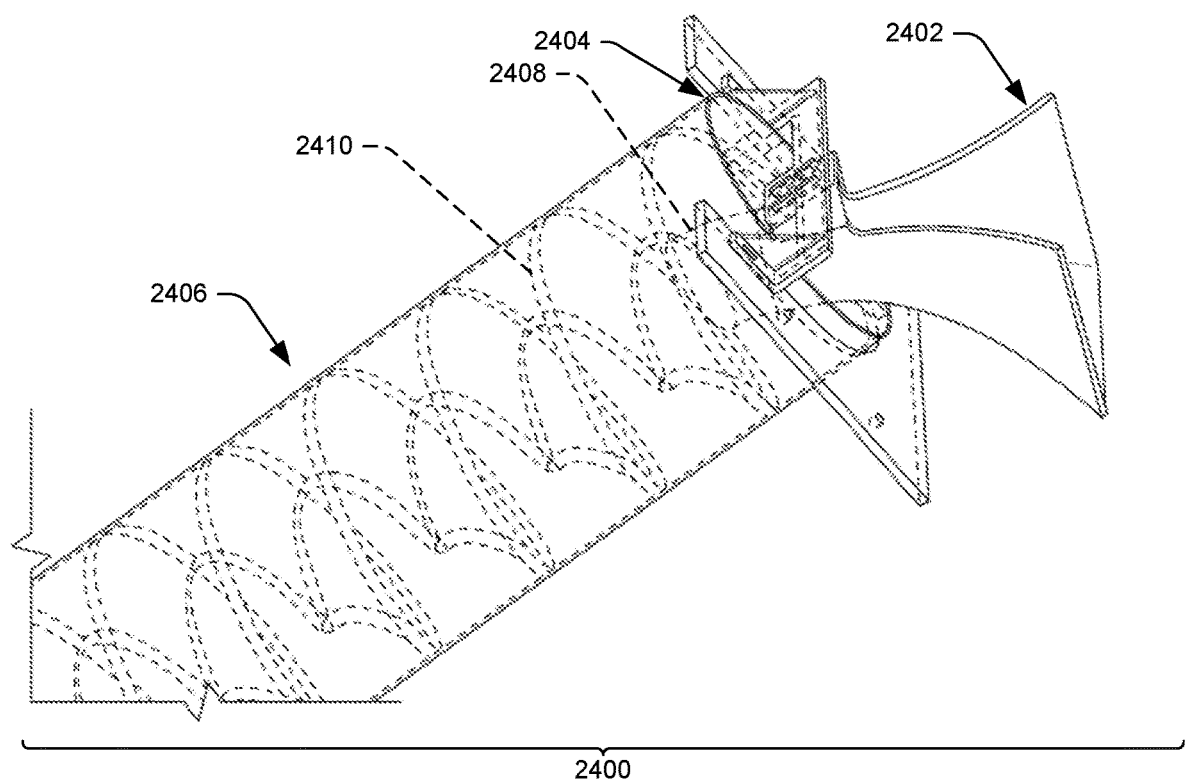
FIG. 24 illustrates a perspective view of an upstream transition according to embodiments of this disclosure.

FIG. 24 illustrates a perspective view 2400 of an upstream transition 2402 according to embodiments of this disclosure. The upstream transition 2402 may be disposed at an upstream end 2404 of a fish pass system 2406. The fish pass system 2406 may be the same as any one of the fish pass systems 102, 202, 302, 408, 802, 902, 1002, 1102, 1802, or 2306. The upstream transition 2402 may provide for volitional passage for fish. Because of the bi-directional nature of the fish pass systems described herein, the upstream transition 2402 may provide for both an entrance and/or exit to the fish pass system 2406, depending upon whether the fish desires to travel upstream or downstream.

The upstream transition 2402 may provide for "inserting" downstream traveling fish into the helix after the first helical blade. By inserting downstream traveling fish into the helix after the first helical blade, the downstream traveling fish avoid a hydraulic acceleration of the water as the water first enters the upstream end 2404 of the fish pass system 2406 from an upper reservoir or headwater. Further, the upstream transition 2402 may provide for changing the "view factor" for fish approaching from upstream so that the rotating helix is not visible to the fish approaching from upstream.

FIG. 24 illustrates the upstream transition 2402 may have a shape similar to a bell or horn. The bell or horn shaped upstream transition 2402 may be squared off, rounded, or any other shape at the bottom portion of the upstream transition 2402. The upstream transition 2402 may include an insertion tube 2408 arranged with the top portion of the upstream transition 2402 opposite the bottom portion of the upstream transition 2402. The insertion tube 2408 may extend a distance into a helical blade 2410 of the fish pass system 2406. For example, the insertion tube 2408 may extend a distance into the helical blade 2410 of the fish pass system to provide for inserting downstream traveling fish into the helical blade 2410 after the first blade of the helical blade 2410.

Figure 25:
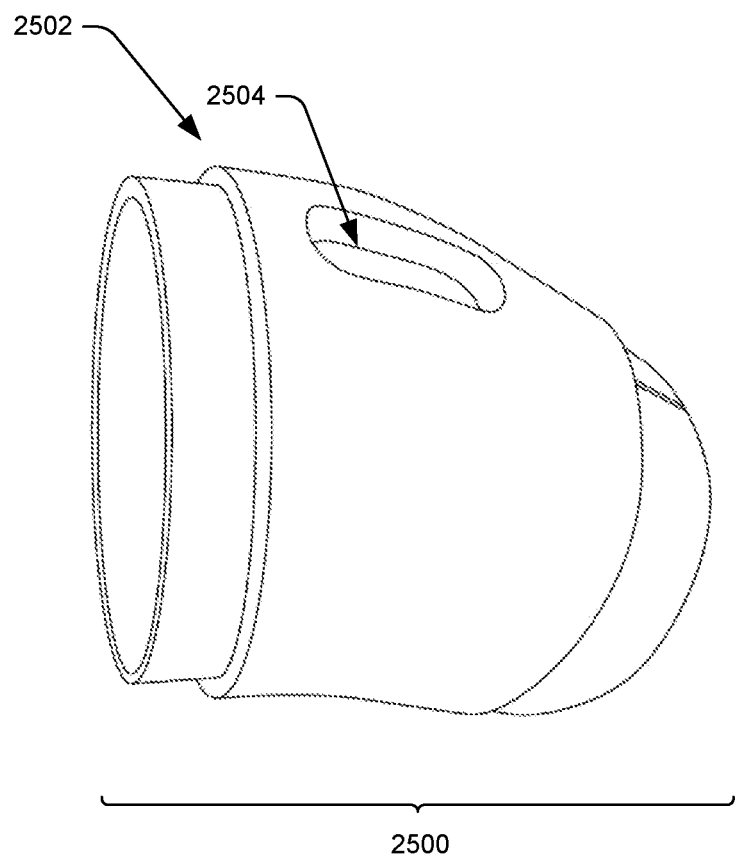
FIG. 25 illustrates a perspective view of an insertion tube according to embodiments of this disclosure.

FIG. 25 illustrates a perspective view 2500 of an insertion tube 2502 according to embodiments of this disclosure. The insertion tube 2502 may be the same as the insertion tube 2408. FIG. 25 illustrates the insertion tube 2502 may include one or more slots 2504. The one or more slots 2504 may provide for preventing suction. For example, the one or more slots 2504 may provide for breaking any potential suction or siphon effect. A length of the insertion tube 2502 may be varied to provide "injection" of downstream traveling fish at any blade position (e.g., first blade position, second blade position, third blade position, etc.). The length of the insertion tube 2502 (i.e., injection location) may depend on a particular species/size and/or life stage of fish expected to be traveling downstream through a fish pass system.

Figure 26:
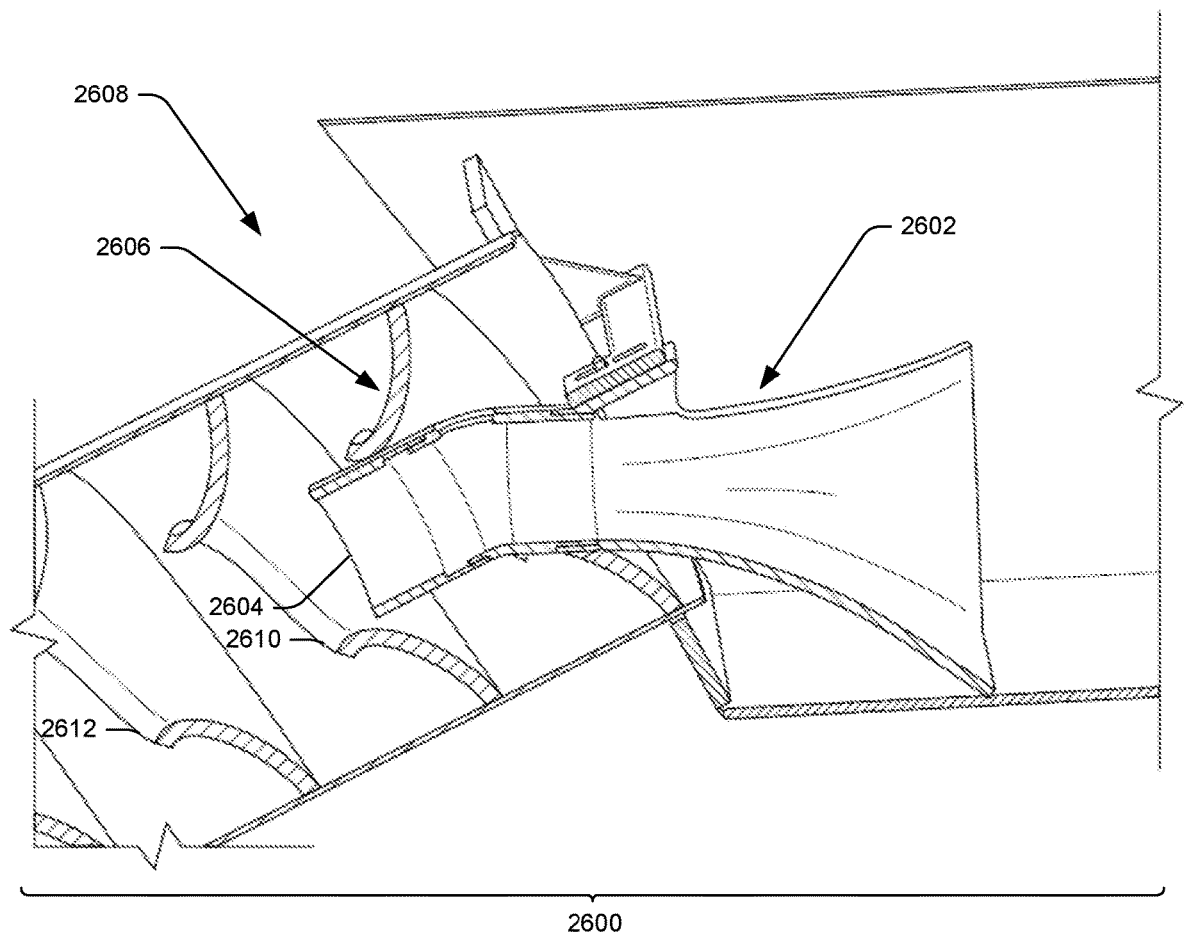
FIG. 26 illustrates a perspective section view of an upstream transition according to embodiments of this disclosure.

FIG. 26 illustrates a perspective section view 2600 of an upstream transition 2602 according to embodiments of this disclosure. The upstream transition 2602 may be the same as the upstream transition 2402. FIG. 26 illustrates the upstream transition 2602 may include about a 3-inch transition member 2604 for "inserting" downstream traveling fish into a helical blade 2606 of a fish pass system 2608 at a second blade 2610 of the helical blade 2606. While FIG. 26 illustrates the upstream transition 2602 including a 3-inch transition member 2604 for "inserting" downstream traveling fish into the helical blade 2606 of the fish pass system 2608 at the second blade 2610 of the helical blade 2606, the upstream transition 2602 may include transition member having any length for "inserting" downstream traveling fish into the helical blade 2606 of the fish pass system 2608 at any blade of the helical blade 2606. For example, the upstream transition 2602 may include a 6-inch transition member for "inserting" downstream traveling fish into the helical blade 2606 of the fish pass system 2608 at a third blade 2612 of the helical blade 2606.

Figure 27:
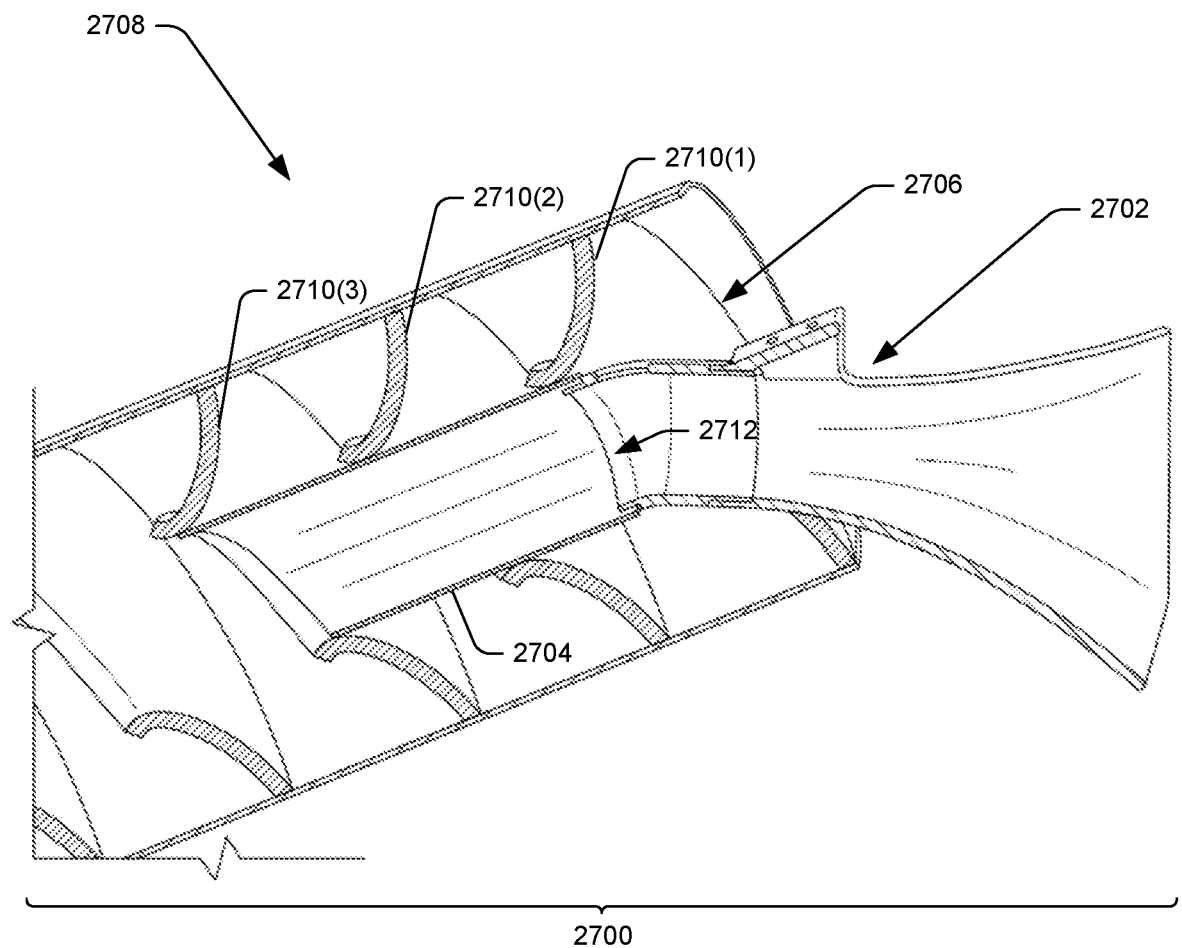
FIG. 27 illustrates a perspective section view of an upstream transition according to embodiments of this disclosure.

FIG. 27 illustrates a perspective section view 2700 of an upstream transition 2702 according to embodiments of this disclosure. The upstream transition 2702 may be the same as the upstream transition 2402. FIG. 27 illustrates the upstream transition 2702 may include a rotating collar 2704 for preventing "pinch points" for fish traveling upstream in a helical blade 2706 of a fish pass system 2708. The rotating collar 2704 may be attached to a respective inner diameter of one or more blades of the helical blade 2706. For example, the rotating collar 2704 may be attached to an inner diameter of a first blade 2710(1), an inner diameter of a second blade 2710(2), and an inner diameter of a third blade 2710(3) so that the rotating collar 2704 rotates with the helical blade 2706. The first, second, and third blades 2710(1), 2710(2), and 2710(3) may be a selected number of uppermost helical blades which are attached to the rotating collar 2704. A top portion 2712 of the upstream transition 2702 may slip into the rotating collar 2704.

Figure 28:
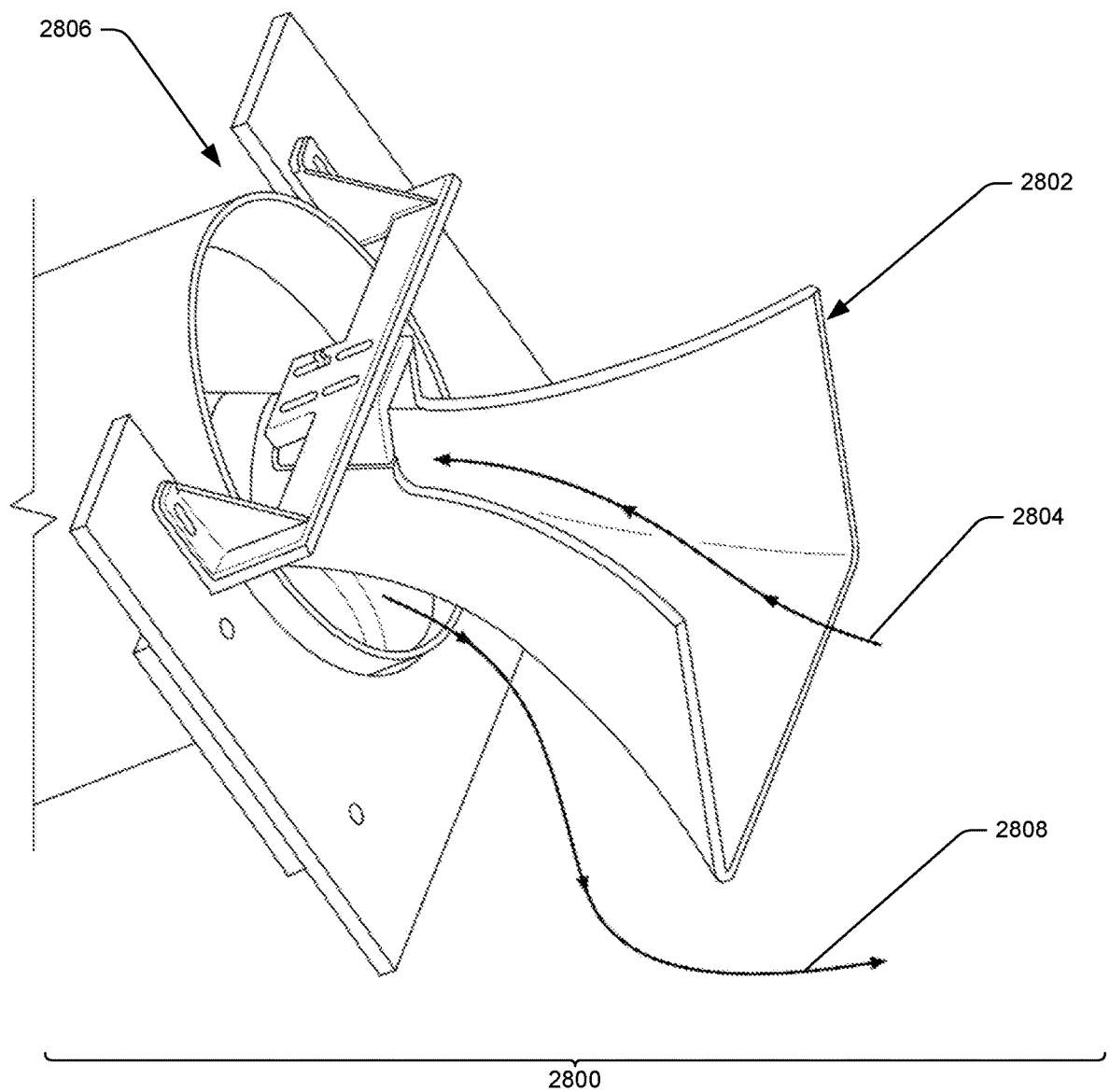
FIG. 28 illustrates a perspective view of an upstream transition according to embodiments of this disclosure.

FIG. 28 illustrates a perspective view 2800 of an upstream transition 2802 according to embodiments of this disclosure. The upstream transition 2802 may be the same as the upstream transition 2402. FIG. 28 illustrates the upstream transition 2802 providing for fish going downstream 2804 to enter a fish pass system 2806 and providing for fish going upstream 2808 to exit the fish pass system 2806. The bell-shape or horn-shape of the fish pass system 2806 allows upstream traveling fish to exit the fish pass system 2806 and move away from the downstream channel inside the bell-shaped or horn-shaped fish pass system 2806.

Figure 29:
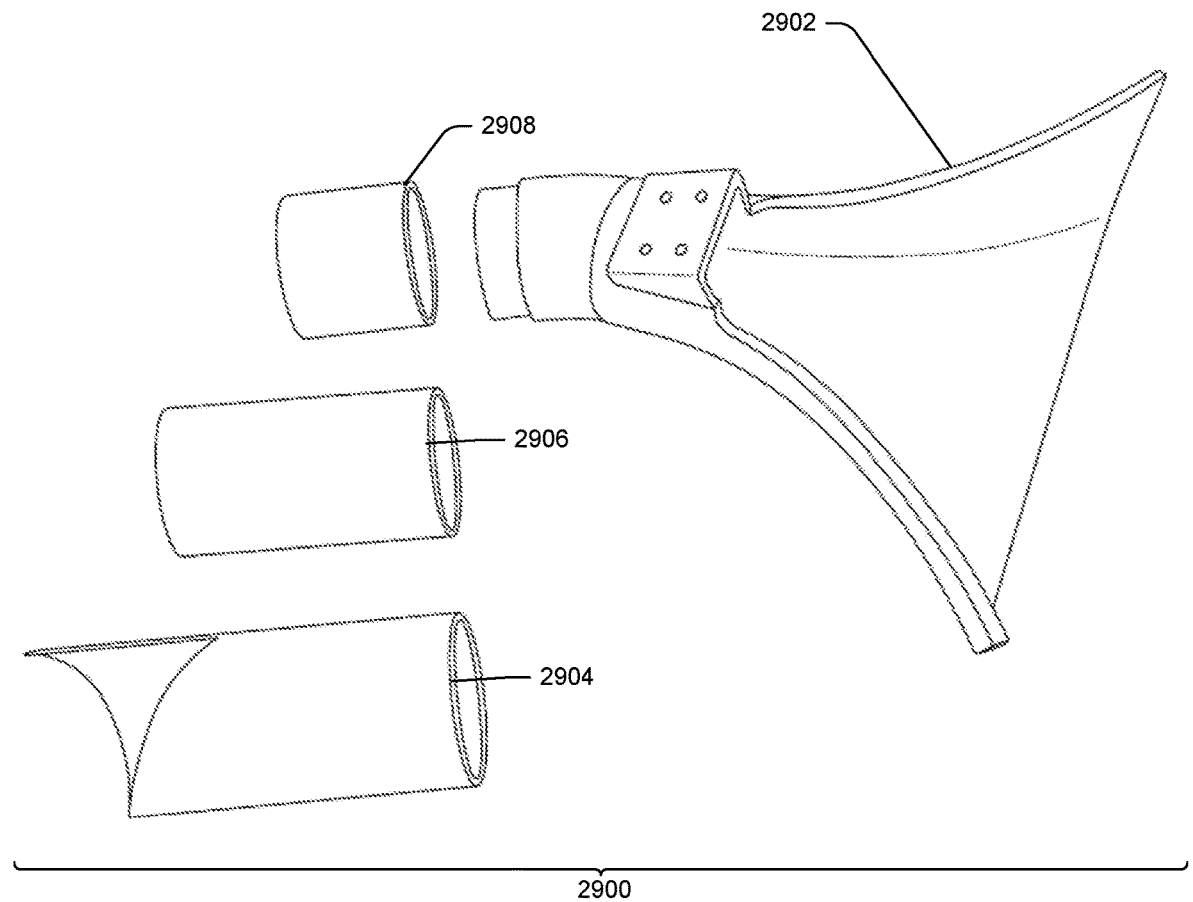
FIG. 29 illustrates a perspective view of an upstream transition according to embodiments of this disclosure.

FIG. 29 illustrates a perspective view 2900 of an upstream transition 2902 according to embodiments of this disclosure. The upstream transition 2902 may be the same as the upstream transition 2402. FIG. 29 illustrates a rotating collar 2904 that may be rotatably attachable to the upstream transition 2402, a 6-inch transition member 2906 that may be attachable to the upstream transition 2402, and a 3-inch transition member 2908 that may be attachable to the upstream transition 2402. The upstream transition 2902 may be used without, or in conjunction with, the rotating collar 2904, the 6-inch transition member 2906, or the 3-inch transition member 2908.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A fish pass system, comprising:
   a helical blade including:
      a first side;
      a second side opposite the first side;
      an outside diameter extending between the first side and the second side; and
      an inside diameter extending between the first side and the second side, the inside diameter for controlling a flow of water flowing in a direction from the first side to the second side, the inside diameter defining an open center of the fish pass system,
   wherein fish traveling in an opposite direction to the direction of the flow of the water pass through the fish pass system by riding or swimming in a volume of water contained in a space between two adjacent turns of the helical blade as the helical blade is rotating upstream or uphill,
   fish traveling in the direction of the flow of the water pass through the open center of the fish pass system by swimming or moving over the inside diameter of the helical blade, and
   wherein the helical blade is a first blade segment of a plurality of blade segments, the fish pass system further comprising a second blade segment of the plurality of blade segments, the first blade segment overlapping the second blade segment from the outside diameter of the helical blade to the inside diameter of the helical blade.

2. The fish pass system of claim 1, wherein the outside diameter of the helical blade is attachable to an inside surface of a tube.

3. The fish pass system of claim 2, wherein the tube is formed of a plurality of tubular segments.

4. The fish pass system of claim 1, wherein the helical blade is integrally formed with an inside surface of a tube as a single unit of material.

5. The fish pass system of claim 1, further comprising a tube formed of overlapping slats, the overlapping slats including respective slots disposed in the overlapping slats, and wherein the first blade segment and the second blade segment interconnect with the respective slots disposed in the overlapping slats.

6. The fish pass system of claim 5, further comprising one or more hoops fastened around an outside surface of the tube along a length of the tube.

7. The fish pass system of claim 1, further comprising:
a tube having a downstream end and an upstream end opposite the downstream end;
a downstream transition disposed at the downstream end of the tube; and
an upstream transition disposed at the upstream end of the tube.

8. A fish pass system, comprising:
a plurality of blade segments defining a helical blade, each of the plurality of blade segments removably attachable to each other along a helical length of the helical blade, and each of the plurality of blade segments including:
a first side opposite a second side;
an outside diameter extending between the first side and the second side of each of the plurality of blade segments along the helical length of the helical blade; and
an inside diameter extending between the first side and the second side of each of the plurality of blade segments along the helical length of the helical blade, the inside diameter for controlling a flow of water flowing in a direction from the first side and the second side of each of the plurality of blade segments along the helical length of the helical blade, the inside diameter defining an open center of the fish pass system, at least a first blade segment of the plurality of blade segments overlapping a second blade segment of the plurality of blade segments from the outside diameter of helical blade to the inside diameter of the helical blade,
wherein fish traveling in an opposite direction to the direction of the flow of the water pass through the fish pass system by a volume of water contained in a space between two adjacent turns of the helical blade as the helical blade is rotating, and
fish traveling in the direction of the flow of the water pass through the open center of the fish pass system within the inside diameter of the helical blade.

9. The fish pass system of claim 8, wherein the outside diameter is attachable to in an inside surface of a tube.

10. The fish pass system of claim 9, wherein the tube is formed of a plurality of tubular segments.

11. The fish pass system of claim 8, wherein the outside diameter is integrally formed with an inside surface of a tube as a single unit of material.

12. The fish pass system of claim 8, wherein the outside diameter is attachable to an inside surface of a tube, the fish pass system further comprising:
a downstream transition disposed at a downstream end of the tube; and
an upstream transition disposed at an upstream end of the tube opposite the downstream end of the tube.

13. A fish pass system, comprising:
a helical blade including:
a first side surface opposite a second side surface, the first side surface extending along a helical length of the helical blade;
an outside diameter extending between the first side surface and the second side surface along the helical length of the helical blade; and
an inside diameter extending between the first side surface and the second side surface along the helical length of the helical blade, the inside diameter for controlling a flow of water in a first direction from the first side surface to the second side surface along the helical length of the helical blade, the inside diameter defining an open center of the fish pass system,
wherein fish traveling in a second direction opposite the first direction pass through the fish pass system by respective volumes of water contained in respective spaces between adjacent turns of the helical blade, and
fish traveling in the first direction pass through the open center of the fish pass, and
wherein the helical blade is a first blade segment of a plurality of blade segments, the fish pass system further comprising a second blade segment of the plurality of blade segments, the first blade segment overlapping the second blade segment from the outside diameter of the helical blade to the inside diameter of the helical blade.

14. The fish pass system of claim 13, wherein each of the plurality of blade segments removably attachable to each other along the helical length of the helical blade.

15. The fish pass system of claim 13, wherein each of the plurality of blade segments are respectively formed as a single unit of material.

16. The fish pass system of claim 13, wherein the outside diameter is attachable to an inside surface of a tube.

17. The fish pass system of claim 16, wherein the tube is formed of a plurality of tubular segments.

18. The fish pass system of claim 13, wherein the outside diameter is integrally formed with an inside surface of a tube as a single unit of material.

19. The fish pass system of claim 18, wherein the tube is formed of a plurality of tubular segments.

20. The fish pass system of claim 18, further comprising one or more hoops fastened around an outside surface of the tube along a length of the tube.

\* \* \* \* \*